US009484616B2

(12) United States Patent
Daniels et al.

(10) Patent No.: US 9,484,616 B2
(45) Date of Patent: Nov. 1, 2016

(54) SUPPORT TRUSS FOR AN ANTENNA OR SIMILAR DEVICE

(71) Applicants: Eric Daniels, Gainesville, FL (US); Gwendolyn L. Daniels, Gainesville, FL (US)

(72) Inventors: Eric Daniels, Gainesville, FL (US); Gwendolyn L. Daniels, Gainesville, FL (US)

( * ) Notice: Subject to any disclaimer, the term of this patent is extended or adjusted under 35 U.S.C. 154(b) by 213 days.

(21) Appl. No.: 14/021,377

(22) Filed: Sep. 9, 2013

(65) Prior Publication Data

US 2015/0069204 A1 Mar. 12, 2015

(51) Int. Cl.

| | |
|---|---|
| ***A01K 97/10*** | (2006.01) |
| ***H01Q 1/12*** | (2006.01) |
| ***H01Q 1/34*** | (2006.01) |

(52) U.S. Cl.

CPC .......... *H01Q 1/1228* (2013.01); *H01Q 1/1235* (2013.01); *H01Q 1/34* (2013.01)

(58) Field of Classification Search

CPC .................. A45B 2023/0012; Y10S 224/922; A01K 97/10

USPC ................................ 248/523, 512, 519, 511

See application file for complete search history.

(56) References Cited

U.S. PATENT DOCUMENTS

| | | | | |
|---|---|---|---|---|
| 2,144,876 A * | 1/1939 | Garnett | A01K 97/10 | 224/922 |
| 3,154,274 A * | 10/1964 | Hillcourt | A01K 97/10 | 248/534 |
| 4,063,704 A * | 12/1977 | Rother | A01K 97/10 | 211/70.8 |
| 4,641,453 A * | 2/1987 | Roberts, Sr. | A01K 97/10 | 43/17 |
| 5,488,798 A * | 2/1996 | Beachel | A01K 97/10 | 248/530 |
| 6,038,994 A | 3/2000 | Ford et al. | | |
| 7,370,599 B1 | 5/2008 | Berman et al. | | |
| 7,621,066 B1 | 11/2009 | Mathison | | |
| 7,644,901 B2 | 1/2010 | Scheper et al. | | |
| 8,333,358 B2 * | 12/2012 | Carnes | A01K 97/10 | 224/197 |
| 8,453,372 B1 | 6/2013 | Moe | | |
| 2003/0057345 A1 | 3/2003 | Smith | | |
| 2004/0026935 A1 | 2/2004 | Tang | | |
| 2006/0070290 A1 | 4/2006 | Toy | | |
| 2006/0124811 A1 | 6/2006 | Tatarsky et al. | | |
| 2009/0038529 A1 | 2/2009 | Walton et al. | | |
| 2011/0262242 A1 | 10/2011 | Marlow et al. | | |
| 2012/0160151 A1 * | 6/2012 | Battaglia | E04H 6/426 | 116/28 R |
| 2012/0318189 A1 | 12/2012 | Oyoung | | |
| 2013/0200087 A1 | 8/2013 | Mango et al. | | |
| 2013/0200124 A1 | 8/2013 | Burwinkel et al. | | |
| 2014/0007487 A1 * | 1/2014 | Schwiebert | E04H 12/2238 | 43/21.2 |

OTHER PUBLICATIONS

Sea Sucker Marine Vacuum Mount System product brochure obtained at the Progressive Tampa Boat Show, Sep. 6-8, 2013, pp. 1-4, Tampa, Florida.

* cited by examiner

*Primary Examiner* — Rodney Mintz
*Assistant Examiner* — Daniel Kenny
(74) *Attorney, Agent, or Firm* — Saliwanchik, Lloyd & Eisenschenk

(57) ABSTRACT

Methods and devices for securing an antenna or similar device to a structure to inhibit undesirable movement when stowed or folded for travel. A truss having a mount and a plug can be used to secure an antenna to a structure, in particular a rod holder of a boat. A truss can be used to secure the antenna and prevent undesirable contact with other structures. Particular embodiments can be configured to accommodate antennas that, when stowed, are not located near a structure.

23 Claims, 15 Drawing Sheets

SUPPORT TRUSS FOR AN ANTENNA OR SIMILAR DEVICE

BACKGROUND OF INVENTION

Recreational boating is enjoyed by a millions of people. Some boats are used on lakes and rivers and are rarely very far from land, while others are used in more distant waters and often lose sight of land during expeditions. Many boats, particularly larger ones, are kept in the water and are pulled out only for repairs, maintenance, or long-distance moves that cannot be made on water. But, most recreational boats are "trailered" to various locales and spend only one or a few days in the water.

Trailering a boat requires a lot of different skills. One of the most important skills is properly securing a boat and all the accessories thereon for travel. In addition, to securing a boat to a trailer, it is also important to secure the various accessories on a boat for safe road travel. One of the most important accessories to secure on a boat is the one or more antennas, which usually connect to a VHF radio, GPS device, AM/FM radio, or other electronic communication devices. Typically, antennas are several feet in length, substantially rigid, and are placed as high as possible on a boat to obtain maximum radio range. On many boats, the highest point is on a cabin roof, a "T-top" cover, or other overhead structure. Larger antennas are usually secured with some sort of folding mechanism, e.g., such as ratchet or fast-fit type mechanism, that allows the antenna to be stowed by being lowered or folded over towards the stern, usually at about the bottom end, when not in use. Such folding mechanisms can be particularly important when trailering boats, since it would be impractical and probably dangerous to travel with an upright antenna. Remembering to lower the antenna can be vitally important.

Unfortunately, a folded or lowered antenna is usually just rested against some part of the structure on which it is mounted. Alternatively, the end of the lowered antenna is simply secured with the folding mechanism so that it suspends in an unsupported manner from the folding mechanism. During travel, on the water or on the road, a lowered antenna can bounce around and against boat structures, potentially causing damage to the antenna, structure, radio contacts, the folding mechanism, or other components. Sometimes an antenna can be secured to the structure by tying or binding it against the structure to inhibit bouncing or other undesirable movement. But, these methods still allow the antenna to rub against the structure, which can also cause damage.

When folded or lowered, it is not uncommon for a stern-facing antenna to be located near one or more rod holders. Rod holders are tubular structures, fixedly attached to a boat or some structure thereon, in which the handle of a fishing rod can be inserted for support. Many boats will have multiple rod holders and often have one or more affixed to overhead structures. T-top structures, for example, are often fitted with multiple rod holders, oftentimes evenly spaced along at least the stern side. However, depending upon the location of the lowered antenna, relative to the rod holders, it may be necessary to bend the antenna to one side, so that it does not rest upon a rod holder. This can be an undesirable configuration because when the antenna moves during travel it rubs or bounces against the rod holder, possibly causing damage to both.

The use of mounted antennas on boats will likely continue, as will the use of rod holders. Thus, there is a need for a device that allows these two necessary components to be secured in the same area or even to the same structure without damage to either one. In general, there is a need for a device that can secure an antenna against a structure to minimize bouncing or other undesirable movement. In an ideal embodiment, the problem is solved by employing the structure itself to assist in securing an antenna. Specifically, there is a need for a device that allows an antenna to be lowered to rest against a structure on which one or more rod-holders may also be secured, without damage to the antenna or the structure.

BRIEF SUMMARY

Antennas and other similarly elongated objects can tend to function optimally by being held in an upright or substantially vertical position. Often, these types of objects are configured to be folded or lowered to a generally horizontal position when not in use, so as to reduce their profile. However, these objects can exhibit undesirable flexing, bouncing, jolting, or other movement along their length. This can be particularly problematic when these objects are moved, such as during travel, or when exposed to high wind or other environmental conditions. Depending upon the length of these objects, such movements can be pronounced and damaging. When more horizontal, such objects are also more susceptible to being bumped into, pushed against, or otherwise contacted in ways not normally experienced when these objects are upright. Excessive movement or contact with an antenna and other similar objects can compromise the integrity of the materials and working components, and can cause damage to surrounding structures.

In accordance with embodiments of the subject invention, the problem of securing an antenna, or other similar object, along its length when lowered or otherwise positioned more horizontally can be solved by utilizing one or more length supporting devices. Such supporting devices can be used to secure an antenna, or similar object, to another structure, so as to inhibit unnecessary or undesirable movement of the length of the object, particularly when positioned horizontally. Once a supporting device is secured to a structure, the antenna or similar object can be seated into or against the supporting device at any point along its length and secured against the supporting device. Once secured to the supporting device, bouncing, jolting, flexing, or other undesirable movement can be reduced or prevented.

In certain embodiments, tubular rod holders, which are a common feature on many recreational boats, are utilized as one structure to which a supporting device can be secured. Rod holders are typically utilized to receive and secure the handle of a fishing rod and are often fitted within the gunnels of a boat. However, additional rod holders are commonly fixedly attached to other parts of a boat. These types of rod holders can have an open bottom end, sometimes with a cross-bar to prevent a rod handle from extending beyond the bottom end. Embodiments of the subject invention can be secured to one or more rod holders located either in the gunnel or other areas of a boat.

The subject invention comprises embodiments of a truss that can be used to support and secure an antenna to another structure. In one embodiment, a truss comprises a plug that can be inserted into a rod holder and a mount that is attached at or about one end of the plug to receive the horizontal antenna or other object. Additional embodiments include various types of plug locks or holding devices that can be used to removably secure the plug of the truss to a rod holder and prevent the plug from being removed and/or various types of coupling members for holding an antenna to the mount. When secured, the truss can lend support along the length of a horizontal antenna or other object, as well as hold it securely in place, advantageously limiting or preventing vertical or horizontal bouncing, jolting, bumping, or other undesirable movement. A further advantage of the truss supporting devices of the subject invention is their ability to reduce or prevent contact of the antenna or other object with surrounding structures.

The truss embodiments of the subject invention can also utilize other apparatuses for securing them to structures other than insertion into a rod holder. It is not uncommon for boats to have braces or frames made from metal tubing, often bolted to the floor, hull, or other area of the boat. Particular truss embodiments of the subject invention have devices or mechanism that can secure them to this metal tubing. These embodiments can be employed when the location of a horizontally placed antenna is not conducive for use with truss embodiments that are employed with one or more rod holders. Alternative embodiments have adjustable mounts that allow a truss to be used with antennas that are not proximal to a rod holder when folded.

The advantages of the embodiments of the subject invention, which will become apparent from the following disclosure, reside in the ability of the devices to secure a generally horizontally aligned antenna or similar object, so as to reduce or prevent undesirable flexing, bowing, bouncing, or other undesirable movement along most or all of the length of the object. The devices of the subject invention can be incorporated as part of, or can be added to, a structure to which the antenna or object is directly or directly attached or that it may encounter or that can be otherwise utilized when the antenna is placed horizontally. Further, the devices of the subject invention can be used singly or multiple devices can be used to secure more than one area of an antenna or other object.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. It should also be understood that the drawings presented herein may not be drawn to scale and that any reference or inference to dimensions in the drawings or the following description are specific to the embodiments disclosed. Any variations of these dimensions that will allow the subject invention to function for its intended purpose are considered to be within the scope of the subject invention. Thus, understanding that these drawings depict only certain embodiments of the invention and are not therefore to be considered as limiting in scope, the invention will be described and explained with additional specificity and detail through the use of the accompanying drawings in which.

DETAILED DISCLOSURE

Figure 1:
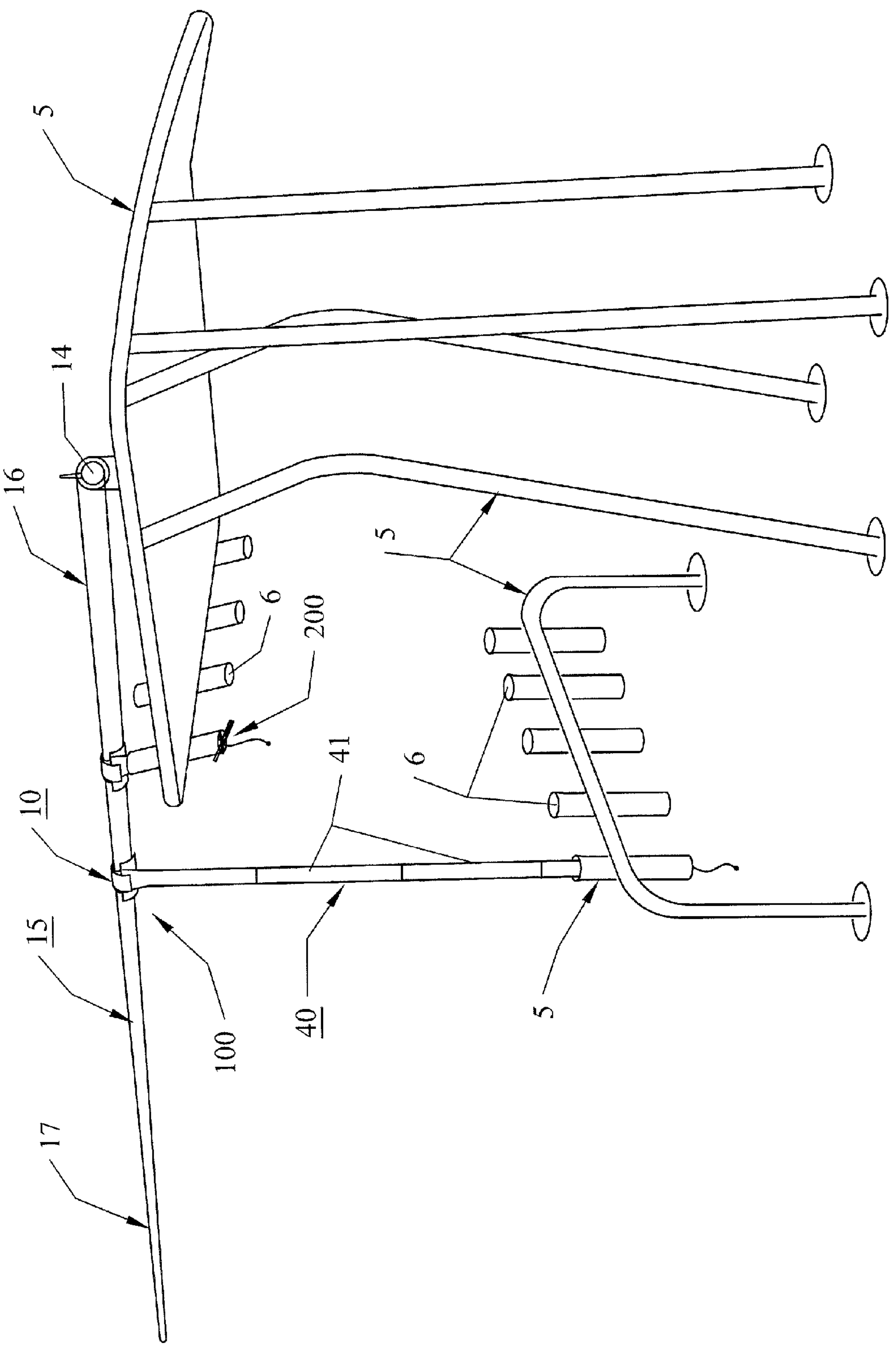
FIG. 1 illustrates different embodiments of the subject invention utilized to secure an antenna extending horizontally from a boat structure (e.g., a T-top cover as shown here). One embodiment has a short plug and another embodiment has a longer plug, both of which can be secured within rod holders at different locations on a boat.

The subject invention in general pertains to embodiments of a device for securing a generally elongated object, such as an antenna, outrigger, push pole, fishing pole, or the like, so as to reduce or prevent undesirable or damaging motion. More specifically, the subject invention pertains to one or more embodiment(s) of a truss, or similar device, capable of providing support at one or more locations along the length of the elongated object. In particular embodiments, a truss of the subject invention is operably connected to one or more rod holders on a vessel.

The following description will disclose that the subject invention is particularly useful on boats, in particular boats that have a folding or lowering antenna or similar such device. The devices of the subject invention are particularly beneficial for use with antennas that can temporarily be positioned horizontally. However, certain embodiments described herein can be utilized with antennas that remain substantially vertical or that cannot achieve a substantially horizontal position. Further, a person with skill in the art will be able to recognize numerous other uses that would be applicable to the devices and methods of the subject invention. While the subject application describes a use for securing an antenna on a boat, other modifications or uses will be apparent to a person with skill in the art, having benefit of the subject disclosure, and such modifications and alternative uses are within the scope of the present invention.

In the description that follows, a number of terms are used in relation to the subject invention and the field of boating and boats in general. In order to provide a clear and consistent understanding of the specification and claims, including the scope to be given such terms, the following definitions are provided.

The term "antenna" as used herein, is merely for literary convenience. The embodiments of the subject invention can be utilized with any device or structure in need of being secured or inhibition of undesirable movement. Thus, while particularly advantageous for use with lowerable or foldable antennas, the embodiments of the subject invention can also be utilized with fishing rods, push poles, radar towers, folding boat towers, pedestal-style accessories (e.g., seats, bait stands, BBQ pits, drink holders, etc.), or any other device in need of being secured to a boat.

The term "boat" as used herein is also merely for literary convenience. While specific embodiments of the subject invention can be advantageously used on a boat or other water-going vessel, embodiments can also be amendable for use in or on other types of vehicles, land-going or water-going, in which an antenna or similar device needs to be secured. By way of non-limiting additional example, the truss embodiments of the subject invention can be used with a "stake hole" in a truck bed.

Further, the phrase "boat structure" refers to a part of, or a feature, on the boat that can be permanently or removably attached to the boat. By way of non-limiting examples, over-head covers (e.g. T-tops and cabins), center consoles, leaning posts, tubular frames, and bench seats, are all types of vessel structures that are typically secured to a boat. The subject application also describes the use of rod holders that, in accordance with the subject invention, can also be considered vessel structures, since they are typically attached to a vessel or to other boat structures.

As used herein, and unless otherwise specifically stated, the terms "operable communication", "operably connected", "operable connection" and literary variations thereof mean that the particular elements are connected in such a way that they cooperate to achieve their intended function or functions. The communication or connection may be direct, or indirect, physical, or remote.

Finally, reference is made throughout the application to the "proximal end" and the "distal end" of the device. As used herein, the proximal end is that end to which the antenna is secured to the device. Conversely, the distal end of the device is that end opposite from where an antenna is secured to the device or, in certain embodiments, that end which is secured to a boat structure and/or inserted into a rod holder.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

Reference will be made herein to the attached figures, which show certain embodiments of the subject invention. Looking at the figures, it can be seen that the subject invention is a type of truss 10 comprising, in general, a mount 20, for receiving an antenna 15, at the proximal end 100 of the truss, which is operably attached to a plug 40. The mount can include a stay mechanism 70 for holding the antenna to the truss. The truss can be further configured with various types of holding mechanisms, such as a securing lanyard 60, mount lock 80, and/or attachment mechanisms 35 that can be used to removably couple the truss to a boat structure 5 such as, for example, a rod holder 6. In a specific embodiment, a securing lanyard or mount lock is used to affixed the distal end 200 of the plug to a structure, specifically, a rod holder.

Many antennas used on boats have a tapered configuration, where the diameter of the bottom end 16 of the antenna, which is that end closer to the folding mechanism 14, tapers to a smaller diameter towards the tip end 17 of the antenna, which is that end further from the folding mechanism, or typically further from the boat when the antenna is deployed. Depending upon the configuration and location of the mount, the antenna may not be capable of lowering to a completely horizontal position. Thus, a lowered antenna may not present a substantially horizontal surface for contacting the truss embodiments of the subject invention. Nonetheless, the embodiments of the subject invention advantageously, and, as will be discussed below, can accommodate a tapered antenna and one that may not be lowered sufficiently to present a fully horizontal surface for securing against a truss of the subject invention.

Typically, thought not exclusively, the embodiments of the subject invention are employed by inserting the plug 40 into a rod holder. In certain embodiments, the plug is inserted into a rod holder that is within, or approximately within, line of the folded antenna. In some cases there may not be a rod holder within, or approximately within, line with an antenna. However, certain truss embodiments disclosed herein can still allow an antenna to be folded down and seated within or against a mount and secured with any of a variety of attachment mechanisms or alternative plug embodiments. Devices for keeping the plug securely attached, such as a plug lock or securing lanyard can also be used, for example, to hold the plug within the rod holder. These various components can be employed in any order and certain of the components may not be utilized under certain circumstances.

With reference to the attached figures, it can be seen that a truss 10 of the subject invention can be configured to various lengths, as shown in the examples in FIG. 1, so as to secure an antenna to boat structures at different places and at different levels on a boat. This adjustable length also provides the advantage of being able to accommodate antennas that may not be lowered to a horizontal, or approximately horizontal, position. Typically, the length of the plug can be altered to reach different areas of a boat. This does not preclude, however, the dimensions of the mount being altered as well. While a single truss 10 can be utilized to effectively inhibit motion of the antenna, two or more trusses may be desirable, such as with exceptionally long or heavy antennas. Multiple trusses may also be desirable to more securely attach the antenna under circumstances of excessive motion. Embodiments disclosed herein also include multiple mounts on a truss.

Figure 2A:
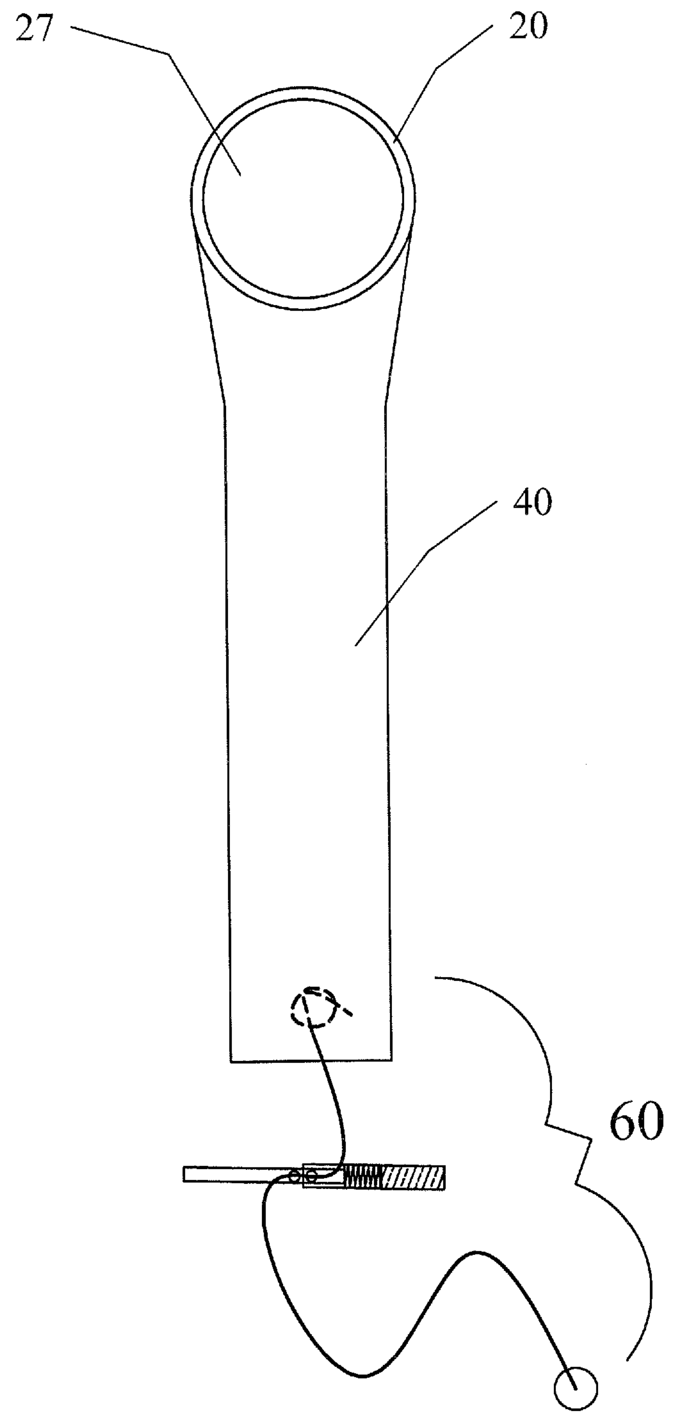
FIG. 2A is a front elevation view of one embodiment of a truss according to the subject invention.

One embodiment of a truss 10 of the subject invention includes a mount 20 at or about the proximal end, such as shown, for example, in FIG. 2A. The mount can provide a surface 22 against which an antenna 15 can rest. The dimensions of the surface 22 can vary, but should be sufficient to provide adequate, safe support for the antenna. Oftentimes, during travel, an elongate antenna, when lowered, becomes subjected to forces that bend it in horizontal and vertical directions, or combinations thereof that causing a torque effect. The longer the antenna, the greater or more exaggerated the bending or flexure can be. Advantageously, a truss of the subject invention can alleviate the effects of these forces by inhibiting flexure, bending, or curvature on the antenna. Thus, placing at least one truss of the subject invention somewhere along the length of the antenna can lend support along the length and can reduce the amount of curvature or flexure.

Ideally, the mount surface 22 contacts and supports the antenna 15 over a sufficient area and/or length, to adequately inhibit undesirable bending, flexing, or curving of the antenna. A mount can have many different shapes or configurations depending upon the shape of the antenna, or other object, that it will be used with. Some embodiments may include a mount having a curved surface, shown, by way of non-limiting example in FIG. 2B, while other embodiments may have a mount surface that is more planar, which is also shown, by way of non-limiting example, in FIGS. 3A and 3B. The point being that a mount can be variable in shape; but, regardless of the shape a mount utilized with embodiments of the subject invention provides support across and/or around an area of the antenna.

Figure 2B:
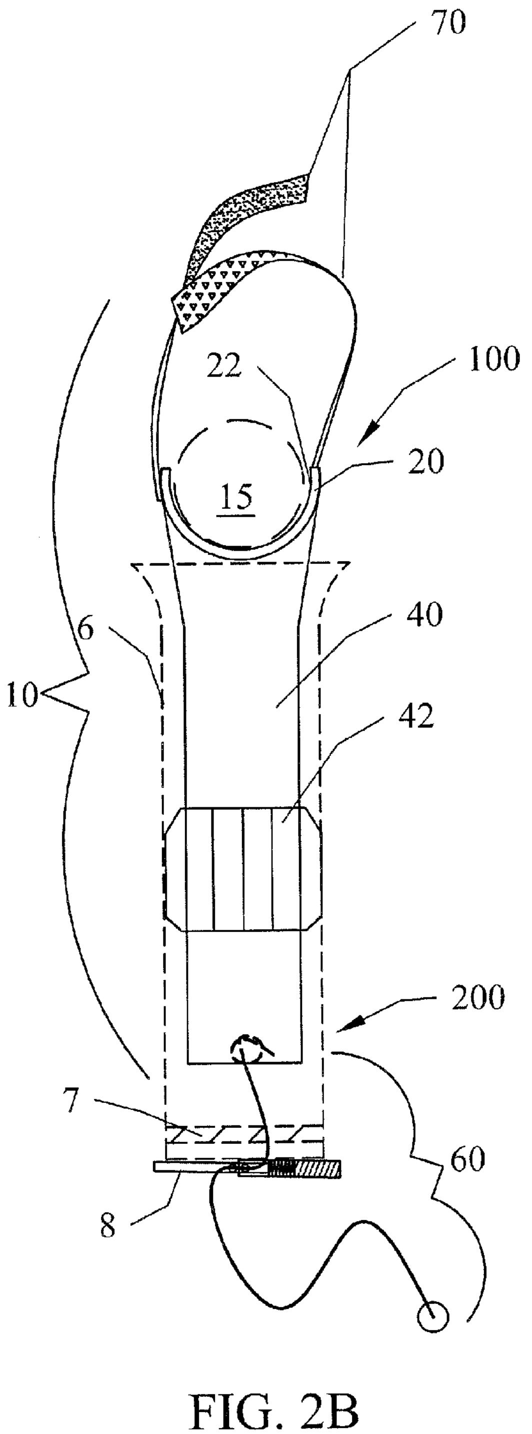
FIG. 2B is a front elevation view of the truss embodiment in FIG. 2A. The dashed lines represent an antenna disposed against the mount and a rod holder into which the plug of the truss has been disposed. The plug in this embodiment is shorter than the length of the rod holder.
Figure 2C:
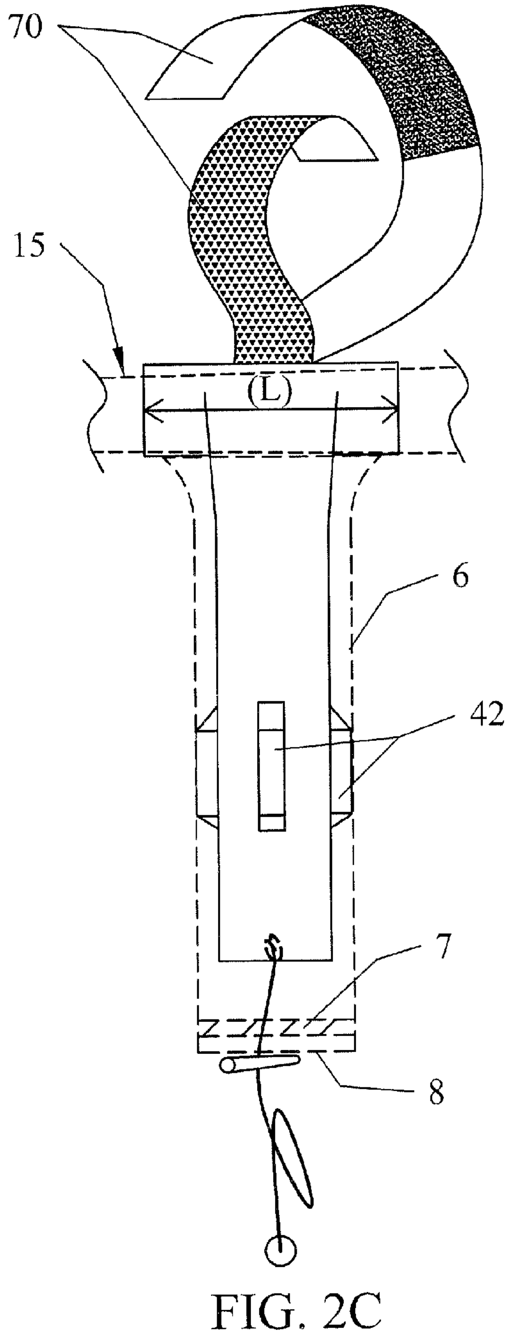
FIG. 2C is a side elevation view of the truss embodiment in FIG. 2B. The dashed lines represent an antenna disposed against the mount and a rod holder into which the plug of the truss has been disposed. The plug in this embodiment is shorter than the length of the rod holder.

In one embodiment, the length (L) of the mount, as indicated in FIG. 2C, is between approximately 2.0 inches and approximately 12.0 inches. This length range can provide significant support to any of a variety of antennas, but even at the highest end of the range, avoids being cumbersome. However, it is possible that a truss 10 of the subject invention would be stored on a boat, where there is often limited space. Thus, in a particular embodiment, the length of the mount is between approximately 2.0 inches and approximately 6.0 inches, which can be a more manageable length for storage. In a more specific embodiment, the length of the mount is between approximately 2.0 inches and 3.5 inches. This length can also provide sufficient support for most antennas and be convenient to store in more areas of a boat. For certain applications, the length of a mount can be less than 2.0 inches. For example, with shorter antennas having a length of about 5 feet or less, a shorter length (L) mount can be used. It should be understood that the length of the mount can vary and could even be greater than 12 inches, mentioned above. Such variations in the length of the mount, which perform the same function, in substantially the same with, with substantially the same result, are within the scope of the subject invention.

A mount of the subject invention can comprise a flexible or semi-flexible material capable of providing rigid support under typical circumstances, but may also be capable of flexing or bending when sufficient non-typical force is applied. Preferably, such material will be weather resistant, and in a further embodiment, is UVA and/or UVB resistant as well. For example, the mount can comprise, but is not limited to, polyvinyl chloride (PVC), plastic, nylon, ceramic, fiberglass, rubber, wood, metal, silicone, glass or glass products, or combinations thereof, with sufficient mass and tensile strength to adequately support an antenna. There may also be cushioning materials utilized with the mount, including, but not-limited to, natural or artificial sponge material, spun fibers, or textile materials attached to the mount that provide cushioning between the mount and the antenna.

Figure 3A:
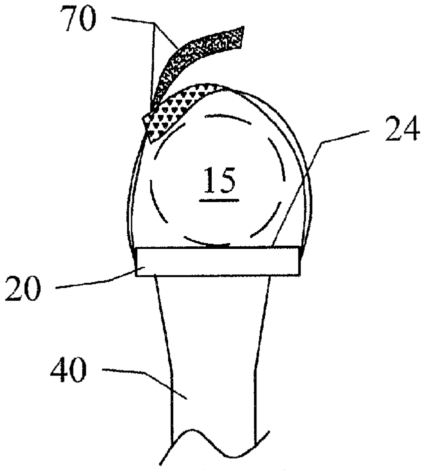
FIG. 3A is a front elevation view of an embodiment of a mount of the subject invention. The dashed lines represent an antenna disposed against the mount.
Figure 3B:
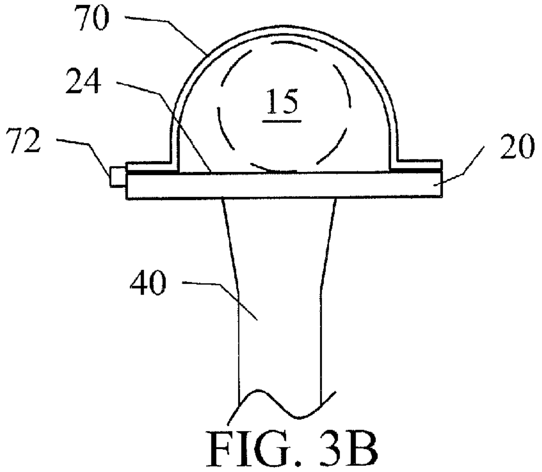
FIG. 3B is a front elevation view of another embodiment of a mount of the subject invention. The dashed lines represent an antenna disposed against the mount.

The shape of the mount 20 can also vary, with some configurations having more or less contact with an antenna, as may be determined. In one embodiment, the mount is a generally flat, platform 24 on which at least part of the lowered antenna rests, an example of which is shown in FIGS. 3A and 3B. With this embodiment, a stay mechanism 70 can be selected that will hold the antenna securely to the flat surface. In a further embodiment, the stay mechanism can conform in some way to the shape of the antenna and/or the platform, as shown, by way of another non-limiting example, in FIG. 3B.

In another embodiment, the mount 20 has a mount surface 22 in the form of a closed shape that can slide over the end of an antenna so that the truss can be moved towards the base of the antenna and positioned or located where desired on a boat structure. By way of non-limiting example, the mount surface can be similar to a bracket sleeve, which is known in the art. The circumferential shape of this closed mount embodiment can be circular, such as shown, by way of non-limiting example in FIGS. 2A, 7A, and 7B. Alternatively, the circumferential shape of the closed mount can be square, rectangular, oval, triangular, or any other polygonal shape. Further, the diameter of the closed mount can vary. In one embodiment, the circumference is between approximately 0.25" and approximately 12.0". In a particular embodiment, the circumference is between approximately 1.0" and approximately 3.0". A person with skill in the art will be able to determine an appropriate diameter and shape for a closed mount. Such variations, which provide the same function, in substantially the same way, with substantially the same result are within the scope of this invention.

In one alternative embodiment, the mount surface is semi-circular in shape, an example of which is shown in FIGS. 2B, 3D, 4A, 5A, and 5B. In another alternative embodiment, the mount surface is generally U-shaped with one or more sections being substantially flat, as illustrated in the non-limiting example in FIG. 3E. With these embodiments, the shape of the mount surface can conform more closely to the diametric shape of a typical antenna, that being substantially circular. The folded antenna can be seated within the mount and against the circular, semi-circular, or U-shaped mount surface. The diameter of a circular, semi-circular, or U-shaped mount can vary, such that it can accommodate a variety of diametrically shaped or sized antennas or be used at any convenient point along the length of a tapering antenna. A stay mechanism 70 can be affixed to the mount and can secure the antenna within mount.

A stay mechanism 70 can comprise any of a variety of configurations and the selection thereof can depend upon the configuration of the mount. As mentioned above, a mount and/or mount surface can comprise any circumferential shape, from a flat platform to a semi-round, U-shape, or any other polygonal shape. Thus, the type of stay mechanism 70 utilized should function compatibly with the shape and size of the type of mount, and/or the intended use or location of the truss.

Figure 3C:
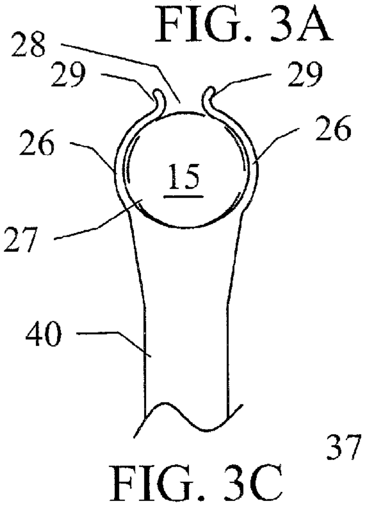
FIG. 3C is a front elevation view of another embodiment of a mount of the subject invention. The dashed lines represent an antenna disposed against the mount.
Figure 3D:
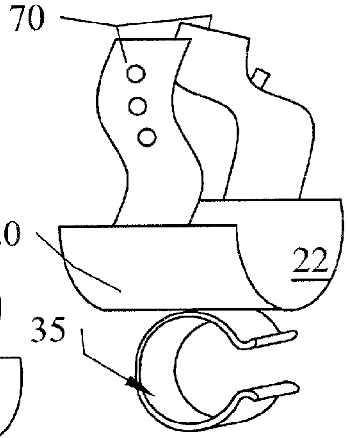
FIG. 3D is a side perspective view of a mount embodiment operably connected directly to a clip.
Figure 3G:
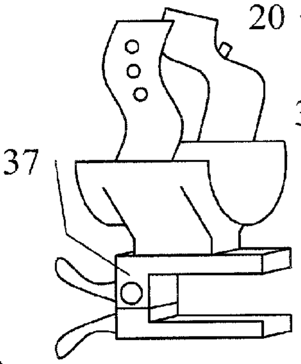
FIG. 3G is a side perspective view of a mount embodiment operably connected to a clamp.
Figure 3E:
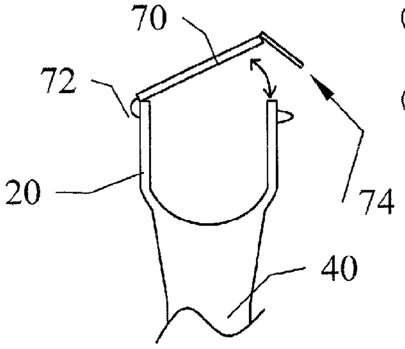
FIG. 3E is a front elevation view of another embodiment of a mount of the subject invention. The arrows indicate that the embodiment of a securing device shown with this embodiment can be rotated away from the mount.

In one embodiment, a stay mechanism 70 is a generally rigid structure that fits over the proximal end of a mount surface. This type of stay mechanism can have a semi-circular or otherwise curved shape, shown, for example in FIG. 3B. Alternatively, it can be substantially flat, such as shown in FIG. 3E. One side of such a stay mechanism can have a rotation mechanism 72 that allows the stay mechanism to be rotatably or otherwise moveably attached to the mount surface, so that the stay mechanism can be flipped, rotated, or otherwise moved out of the way of the mount surface and then put back into place over the mount surface, to secure an antenna against or at least proximal to the mount surface. In a further embodiment, the stay mechanism can have a locking mechanism 74 that temporarily prevents the stay mechanism from moving once emplaced over a mount surface. There are numerous types of rotation and locking mechanisms that can be utilized with embodiments of a stay mechanism, according to the subject invention. Rotation mechanisms such as, but not limited to, hinges, living joints, slide pins, or even something as simple as a flexible cord affixed to the mount and the stay mechanism can be used. Likewise, lock pins, snaps, toggle bolts, or even just a screw and bolt are non-limiting examples of locking mechanisms known in the art that could be used with the embodiments of the subject invention. FIG. 3B illustrates one example of a stay mechanism utilized with a platform type of mount surface. FIG. 3E illustrates another embodiment of a stay mechanism and a lock mechanism utilized with a U-shaped mount. Such stay mechanisms could also be employed with any other embodiments of a mount surface. A person with skill in the art can determine alternative devices and methods for allowing movement of an, at least partially, rigid or semi-rigid stay mechanism and rotation and lock mechanisms that can operate as described above. Such alternative embodiments are within the scope of this invention.

In another embodiment, a stay mechanism 70 can comprise a length of "hook-and-loop" material, such as, for example, the commercially known product VELCRO. With this embodiment, an elongated length of the hook side of the material can be fixedly attached to one side of a mount surface and the loop side of the material can be fixedly attached to an opposite side of the mount surface. After an antenna is placed against the mount surface, the hook-and-loop material can be engaged to close over the mount surface and secure the antenna to the truss. FIGS. 3A, 3D, 4A, 8A, 8B, and 11B all show examples of mount embodiments of the subject invention having a hook-and-loop stay mechanism.

In another particular embodiment, the mount 20 is in the form of a clip 35. Clips are well-known in the art and can have any of a variety of configurations. In general, clips are designed so that some object can be pushed through a slot or opening between two curved projections that typically form a circular or semi-circular central space, such that the object is held within the central space by the curved projections. Alternatively, the projections can be substantially linear and parallel and hold an object within the central space by frictional force. A clip can also be some combination of these embodiments. FIG. 3C illustrates a non-limiting embodiment of a clip-type mount according to the subject invention. In this embodiment, the clip has two projections 26 with a slot 28 therebetween. The slot can be located anywhere around the clip and in this embodiment is it located at the proximal end of the truss 10. In an alternative embodiment, the slot is located more towards one or the other side of the clip, such that the projections have different lengths. With this embodiment, an antenna can be folded down and pushed through the slot 28, so that it is secured within the central space by the projections, which, in this non-limiting example, form a generally circular central space 27. In a further embodiment, one or more guides 29 can be fixed to a projection near the slot 28 to aid in guiding an antenna through the slot. FIG. 3C illustrates a non-limiting example of a clip-type mount embodiment.

Figure 3F:
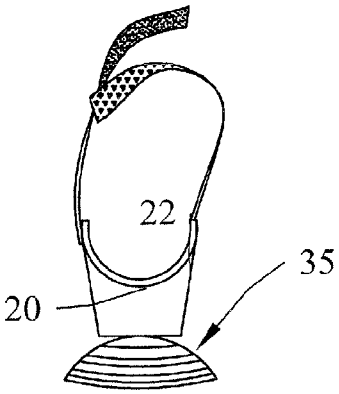
FIG. 3F is a side perspective view of a mount embodiment operably connected to a suction cup.
Figure 6A:
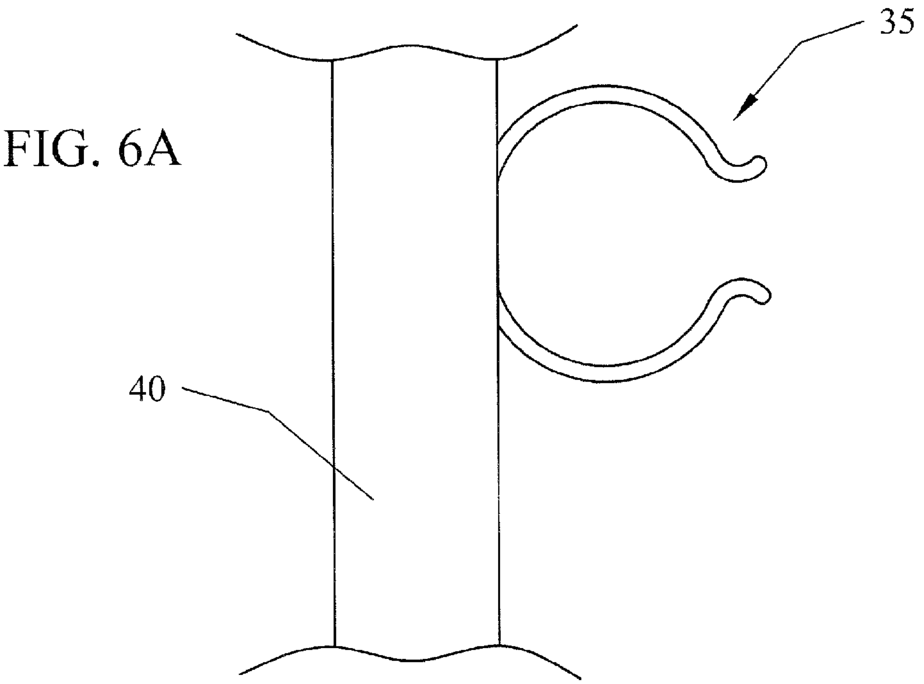
FIG. 6A is a partial view of a plug with an attached adjustment mechanism.
Figure 6B:
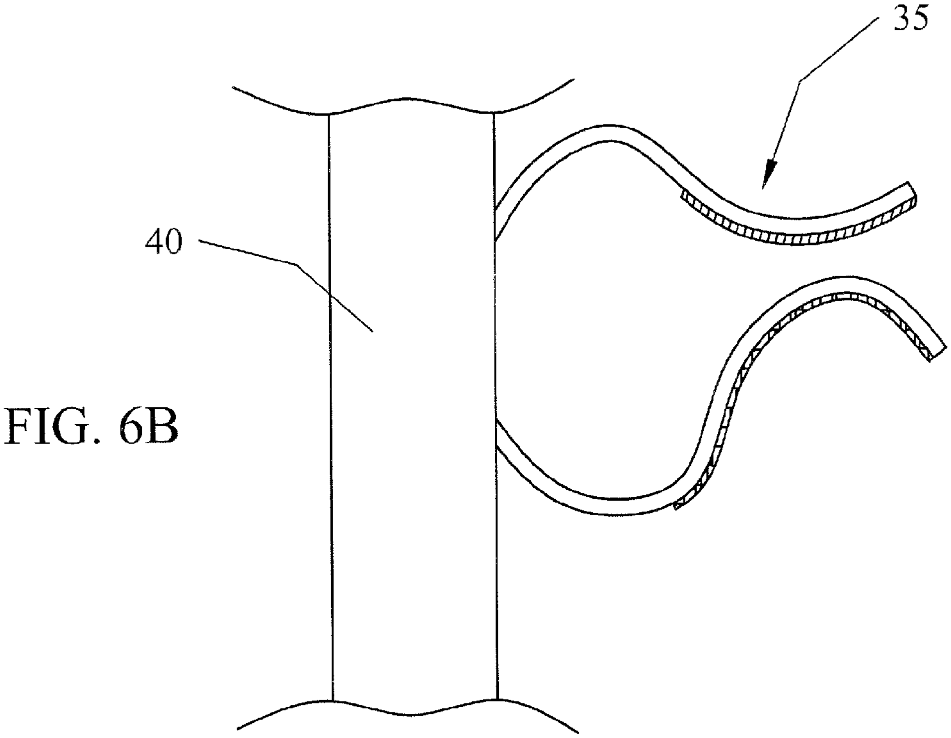
FIG. 6B is a partial view of a plug with an alternative attached adjustment mechanism.

A mount 20 of the subject invention can be attached directly to a boat structure 5. Such attachment can be achieved by any of a variety of attachment mechanisms 35. In one embodiment, the mount is fixedly attached to a device that can be used to clip or clamp the mount onto a boat structure, such as shown, by way of example, in FIGS. 3D and 3G. There are any of a variety of clamps 37 that can be used to attach a mount to structure including, but not limited to, alligator clamps, jaw clamps, C-clamps, D-clamps, pressure clamps, or any other type of clamp or clamp-like device that can be secured to a boat structure and support a mount. In another embodiment, the mount is attached to any one or more of a variety of suction cups 39 that can be used to attach the mount to a boat structure, shown, for example, in FIG. 3F. In one specific embodiment, a mount is attached to a vacuum-activated suction cup, such as, for example, the SeaSucker® brand vacuum-cups. In still another embodiment, the mount can have one or more straps affixed thereto that can be used to secure it to a boat structure, and can include one or more buckles, clamps, D-rings, hook and loop material, or other mechanical devices. It can be preferable for such attachment means to be adjustable in various ways, so that the mount can be affixable to any appropriate boat structure. FIG. 6B illustrates an example of straps that can be attached directly to a mount 20 to secure it to a boat structure. As will be discussed in more detail below, an attachment mechanism 35 can also be a slidable mechanism, such as, by way of non-limiting example, a bracket sleeve that encircles and can slide along the length of a boat structure or other device. It is within the skill of a person trained in the art to determine one or more attachment mechanisms that could be utilized with the mount and plug embodiments of the subject invention. Such variations are within the scope of the subject invention.

In a specific embodiment, the mount 20 of a truss 10 is secured at or about the proximal end 100 of a plug 40. The mount can be a separately manufactured component that is fixedly attached to the plug by any suitable means known to those with skill in the art. Alternatively, the mount and plug can be manufactured contiguously or as a single piece. In still another embodiment, the mount and plug can be some combination of contiguous and separately attachable components.

Figure 5A:
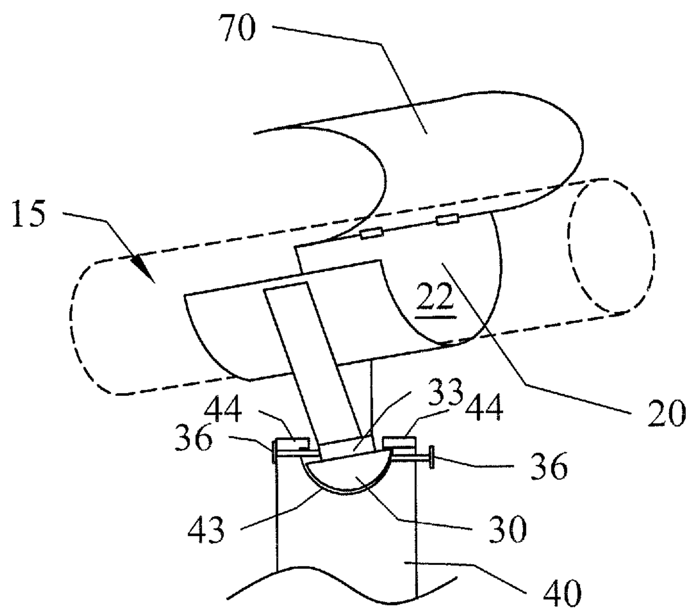
FIG. 5A is a partial view of another embodiment of a truss according to the subject invention wherein the mount is operably attached to the plug with a ball and socket mechanism.

In another specific embodiment, the mount can be rotatably attached to the plug or directly to another attachment mechanism mentioned herein. In a particular embodiment, the mount and plug are rotatably attached by a ball-and-socket configuration. This can allow the mount to rotate and/or pivot in multiple directions. FIG. 5A illustrates such an embodiment and shows a cross-sectional view of a plug 40 having a socket 43 therein and a mount 20 having ball 30 attached thereon for fitting into the socket. The ball can be retained in the socket by an overhang 44, such as a lip or other protrusion over the socket that retains the ball in the socket. Such arrangements are well-known in the art and variations thereof are within the scope of this invention. In one embodiment, the ball is semi-spherical and comprises less than a full hemisphere. However, an alternative embodiment can utilize ball 30 comprising a more than a full hemisphere, or a ball comprising almost a full sphere. With such semi-spherical or spherical embodiments, the mount 20 can tilt from side to side, front to back or any combination thereof, up to or about 180° in any direction. Further, the mount can rotate (spin) up to 360° in either direction. Thus, a mount can be provided with at least six-degrees of motion freedom. Advantageously, this embodiment allows the truss to be utilized even when an antenna is not directly lined up with a rod holder. The mount can be tilted or rotated appropriately to accommodate an antenna that may fold to one or the other side of a boat structure, such as a rod holder. Such ability to rotate and/or tilt also allows the mount to secure antennas that may not be substantially horizontal when folded. FIG. 5A illustrates a non-limiting example of a ball-and-socket truss embodiment where the mount has been tilted to one side and rotated slightly to accommodate an antenna that is not in-line with the rod holder.

Another specific embodiment employs a rocking mount that can be tilted or rocked in two directions over the proximal end of the plug. Rocking mechanisms are well-known in the art and are utilized with a variety of mechanisms, often to provide adjustability. With the subject invention, the mount 20 can attached at or about to the proximal end 100 of the plug 40, or other attachment mechanism described herein, such that the mount can be rocked or tilted in two opposite directions. This embodiment can also allow the mount to accommodate antennas that may not fold to a fully horizontal position. Beneficially, when utilized with a rod holder, the plug of the truss can be rotated within the rod holder. If utilized without a plug, the mount can be attached to any of the attachment mechanisms described herein. Thus, by rotating the plug within a rod holder and tilting the mount, this truss 10 embodiment can also accommodate a variety of antenna placements.

Figure 5B:
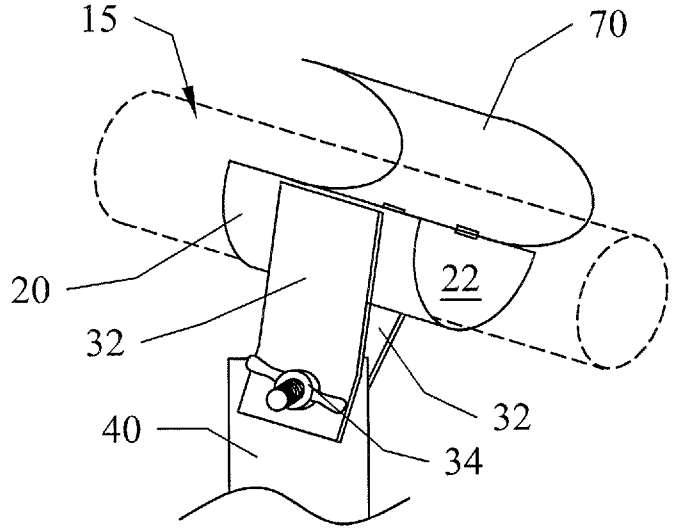
FIG. 5B is a partial view of another embodiment of a truss according to the subject invention wherein the mount is operably attached to the plug with rocker arms.

In one embodiment, at least one, preferably at least two, rocker arms 32 are operatively attached to a mount embodiment. The rocker arms extend towards the plug 40 and are rotatably attached to the plug with any of a variety of rotation mechanisms 34. FIG. 5B illustrates a simple example of a rocking mount embodiment. Rotatable attachment can be accomplished by any of a variety of rotation mechanisms known to those with skill in the art, including, but not limited to, cotter pins, cross-pins, pin and groove, through rods, screw and bolt, and other mechanisms and techniques known to those with skill in the art. Such variations, which provide the same function, in substantially the same manner, with substantially the same result, are within the scope of the subject invention.

It can be helpful if the position of a moveable mount, such as the ball-and-socket or rocker mount embodiments described above, can be held in the desired position when the antenna is not disposed therein. Thus, in a further embodiment, a truss can include one or more mount locks 36 for holding the position of the mount relative to the plug. For example, one or more screws can have operable contact with the ball 30 of a ball-and-socket embodiment, as shown, for example, in FIG. 5A. The screws can extend through the socket to be tightened against the ball to prevent movement and secure the position of the mount. Another example can utilize a flexible or deformable collar 33 operably connected to some part of the mount, against which one or more screws or bolts can be tightened to hold the position of the mount. FIG. 5A, again, shows an example of a deformable collar 33 around the base of a mount, with at least one screw, ideally at least two screws, capable of making connection with the collar 33 to hold the position of the mount. In another embodiment, a rotation mechanism 34 can be dual purposed as a mount lock 36. By way of example, the rocker mechanism can be a wingnut and bolt arrangement that operably connects the rocker arms 32 to the plug, but which can also be tightened to maintain the position of the rocker arms against the plug. FIG. 5B shows a partial view of a wingnut against one side of a rocker mount engaged with a bolt that extends through the plug from the opposite side (not shown). It would be within the skill of a person trained in the art to determine alternative varieties of mechanisms that can be used to lock the position of a moveable mount. Such variations are within the scope of this invention.

The general purpose of a plug, as utilized with embodiments of the subject invention, is to facilitate attachment of a mount to a boat structure. As such, a plug 40 can encompass a variety of configurations depending upon the type of structure the truss 10 is to be attached to. It should first be understood that the length and circumferential shape of a plug can vary and that such length and circumferential shape can be dependent upon the location of the antenna, how the antenna will be secured to the mount, the location or type of boat structure to which it will be attached, and other factors understood by those with skill in the art. By way of non-limiting example, a plug can have a circumferential shape that is round, oval, square, trapezoid, rectangular, triangular, or any other polygonal shape. Likewise, it is also possible for the length of a plug to be adjustable. FIG.

1 illustrates examples of trusses 10 according to the subject invention that have a relatively short length plug (used near the T-top) and a long length plug (used in the rocket launcher) embodiments. This can be accomplished by any of a variety of devices and techniques understood by a person skilled in the art. For example, a plug can comprise multiple sections 41 that are operably connected, as shown, by way of example, in FIG. 1. The multiple sections 41 can be telescoping sections that can be locked or secured to a desired length. The plug can also comprise two or more sections 41 that can be fitted or locked together. The plug could comprise two or more folding sections 41. The plug could comprise sections or a material that allows it to be customized to a desired length, such as by cutting or breaking away unnecessary sections or material. The plug of a truss could also be manufactured to a specific length according to the needs of a user or pre-manufactured in specific lengths. The variations discussed above for providing adjustable plug lengths are known in the art and, as such, have not been illustrated here. A plug can also comprise a variety of shapes or configurations, other than linear. For example, the plug can be curved or bent to accommodate a particular boat structure, or for aesthetic or ergonomic considerations. Since the purpose of the plug is, in general, to support the weight of an antenna, any design that achieves this and that can be attached to or supported by a boat structure can be employed with the embodiments of the subject invention. Thus, plug embodiments of the subject invention can vary greatly in shape, size, length, and operation. Such variations, which provide the same function, in substantially the same way, with substantially the same result are within the scope of this invention.

The truss 10 embodiments of the subject invention are, for the most part, designed to secure an antenna to a boat structure and limit movement of an antenna. In some instances, however, it can be beneficial if an antenna, which is secured to truss 10 attached to a boat structure, is permitted some movement, particularly a controlled or confined movement. For example, thicker, longer, or heavier antennas secured to a truss of the subject invention may benefit from being allowed some vertical and/or horizontal movement to prevent undesirable bending. This can be particularly of issue if the location of the antenna allows only a single truss to be attached to a larger antenna. Further, while a truss of the subject invention can inhibit most undesirable bending and flexing of an antenna, there may be times when the boat is subjected to excessive motion or jolting force (e.g., during inclement weather, bad roads during trailoring, rough handling during docking, etc.). This can cause an antenna to also be subject to excessive or jolting forces and can further cause damage to whatever boat structure the truss has been secured to, or could damage the truss itself. Thus, it can be beneficial if a truss can provide some type of cushioning effect to counteract excessive, jolting, or otherwise potentially damaging motion.

Plug embodiments utilized with a truss of the subject invention can be adapted to have or provide some elasticity, flexibility, bounce, or other cushioning capability to the mount and/or antenna disposed therein. One embodiment of the subject invention utilizes a plug comprised of a flexible or semi-flexible material capable of providing rigid support under typical circumstances, but capable of flexing or bending when sufficient or non-typical force is applied. For example, the mount can comprise, but is not limited to, polyvinyl chloride (PVC), plastic, nylon, ceramic, fiberglass, or combinations thereof, with sufficient mass or tensile strength to meet the criteria mentioned above. Preferably, the plug material will be weather resistant, and in a further embodiment, is UVA and/or UVB resistant as well.

In another embodiment, the shape of the plug can be such that certain areas or portions of the plug will bend or flex. By way of example, the plug can comprise areas that are thinner, narrower, or of otherwise less tensile strength than other areas. In one embodiment, the plug has one or more slits or cuts within the plug material, such that the plug will flex or provide motion and/or cushioning capabilities at those areas. Such embodiments can be particularly amendable for, but are not limited to, use with longer length plugs, such as shown in FIG. 1.

Figure 8A:
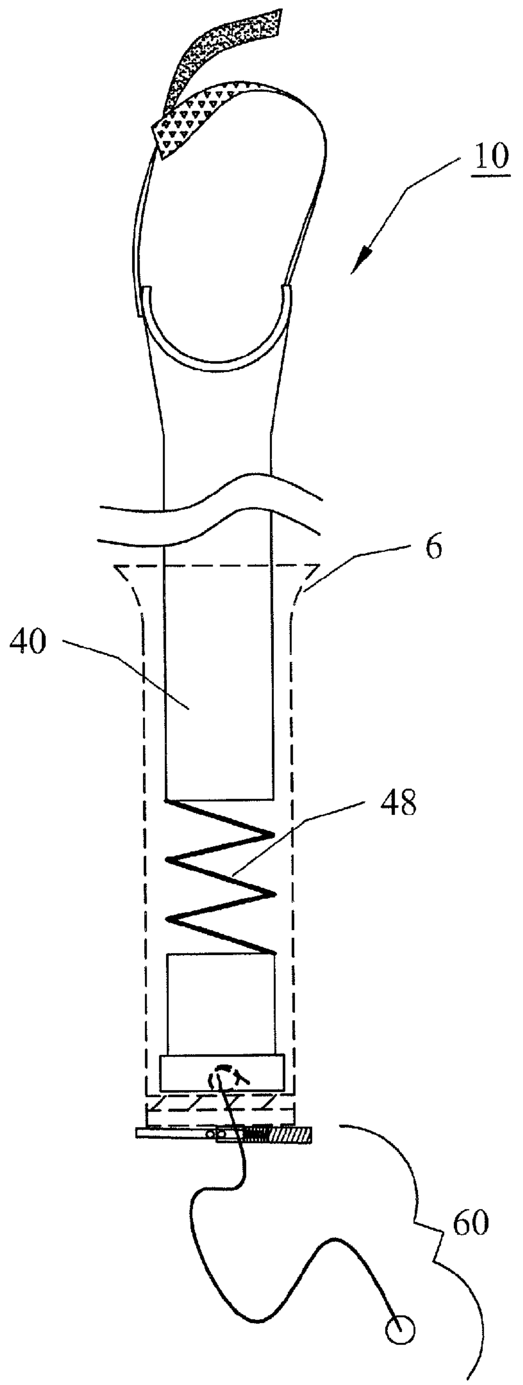
FIG. 8A is a front elevation view of a truss embodiment with a spring as an operable part of the plug.
Figure 8B:
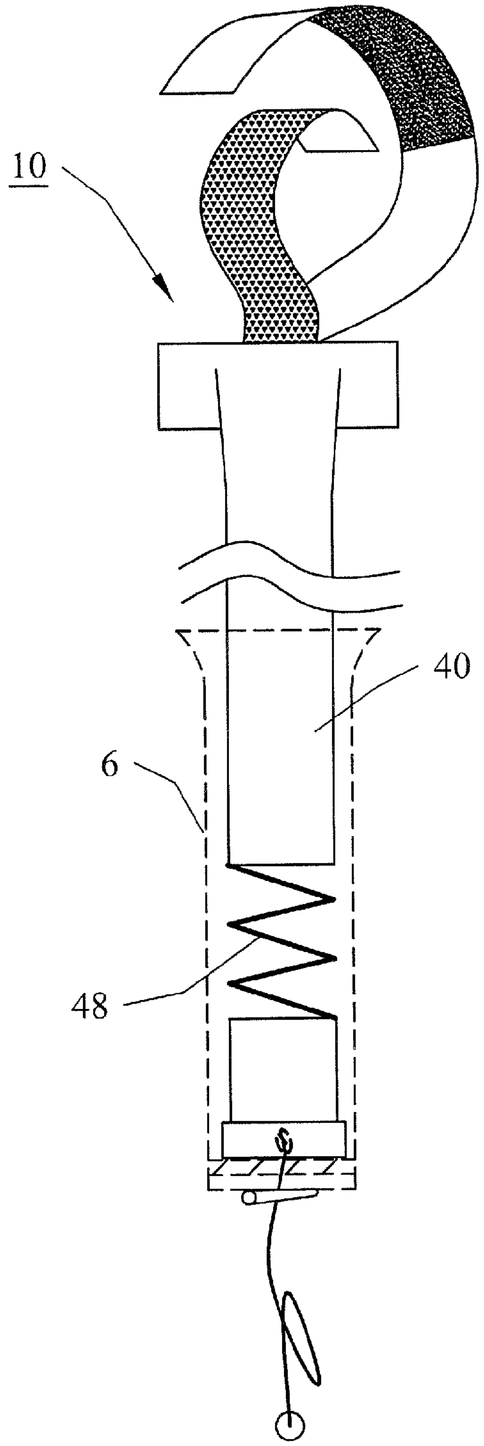
FIG. 8B is a side elevation view of the truss embodiment in FIG. 8A.

A plug of the subject invention can also have flexible attachments or accessories thereon that provide sufficient cushioning for flexing capabilities. FIGS. 8A and 8B illustrate a plug embodiment fitted with at least one spring 48 between at least two sections of the plug. The spring can have a tensile strength that provides firm, rigid support, but has the capability of cushioning an antenna within the mount when a pre-determined amount of force is applied to the spring, such as by the antenna exerting force against the mount. In an alternative embodiment, one or more devices comprising an elastomeric material can be utilized between sections of the plug to provide cushioning. In yet another alternative embodiment, a plug can comprise two or more sections joined by a flexible joint that allow the plug sections to be rotated, turned, twisted, or otherwise moved to accommodate an antenna. A flexible joint is discussed below with regard to an attachment mechanism, and such embodiment can be adapted for use with a plug. Thus, any of a variety of springs or spring-like attachments, elastomeric structures, jointed sections, or similarly-functional structures can be utilized. A person with skill in the art will be able to determine appropriate devices, techniques, or methods for providing a desirable amount of cushioning to a truss. Such variations, which provide the same function, in substantially the same way, with substantially the same result, are within the scope of this invention.

It is not uncommon for a boat to have more than one antenna or multiple, similar type structures that can benefit from being secured to a boat structure. Fishing boats often have "towers" that rise above the boat deck for increased visibility. Oftentimes, such towers fold over for travel. Also, some boats have multiple antennas for different devices or elongated push poles that have to be secured when not in use, ideally, by at least two points to prevent torqueing or twisting. In such instances, multiple trusses 10 according to the subject invention can be utilized to secure each device. However, there may also be instances where the antenna or other similar apparatus cannot be located sufficiently adjacent to a boat structure for use with a truss. In such instances, it can be advantageous for the truss to be adjustable in such a way that it can accommodate an apparatus that is not adjacent to a boat structure or that can accommodate multiple devices. While the use of a single, properly configured mount to secure multiple devices is possible, according to the subject invention, it can also be possible to utilize a truss having more than one mount.

In one embodiment, a plug of the subject invention is configured with two or more mounts 20 and/or mount surfaces 22. The two or more mounts or mount surfaces can be fixedly attached to the plug, as described above. Alternatively, two or more moveable mounts 38 can be disposed on the plug. In one embodiment, a moveable mount is one having one or more adjusting mechanisms 35 that allow the mount to slide or be otherwise moved along the length of a plug 40. FIG. 9A illustrates an example of one type of a plug 40 on which a moveable mount 38 is disposed, so as to move upwards or downwards on the plug (indicated by the double-head arrow). More than one moveable mount can be used on a plug. The mount surface can be aligned in any direction. In one embodiment, shown in the example in FIG. 9A, the mount surface is aligned towards the side of the plug, where an antenna can be pushed or pressed sideways against the mount surface 2. A mount surface can also be aligned towards the proximal end of the plug, such that an antenna can be seated into the mount as described previously.

Figure 9B:
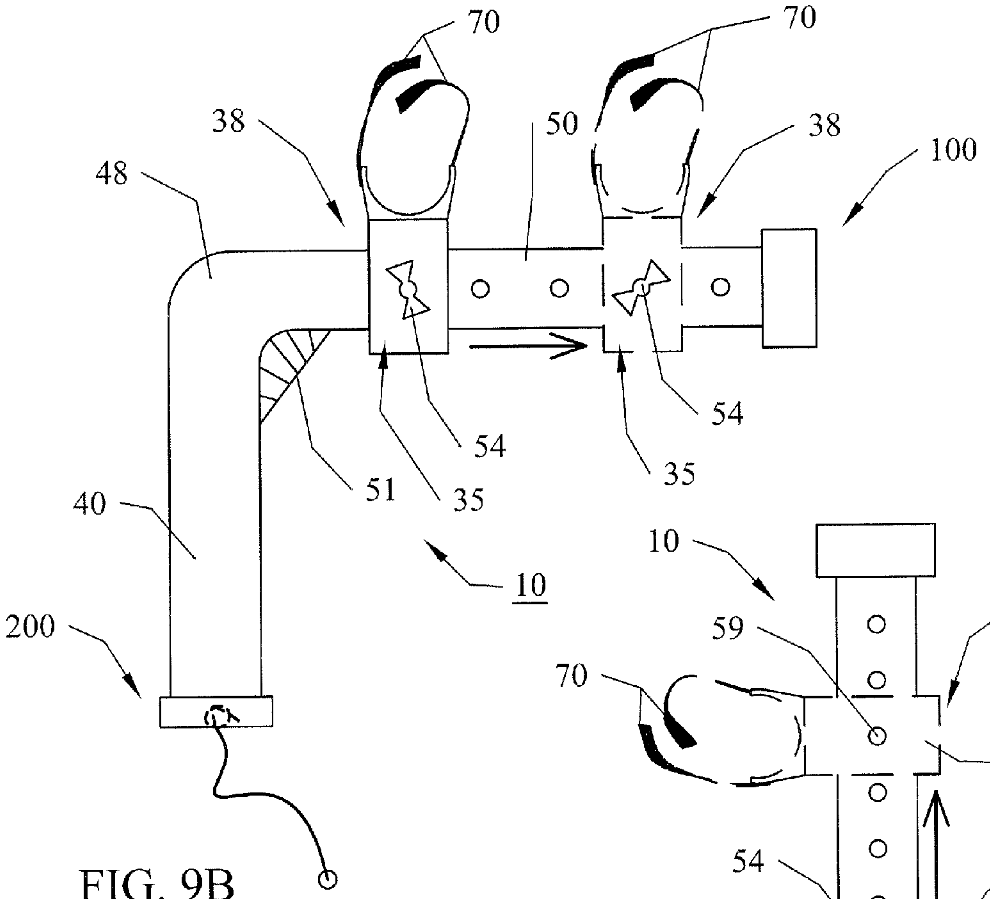
FIG. 9B is a front elevation view of a truss embodiment having a bent plug with moveable mounts.
Figure 9A:
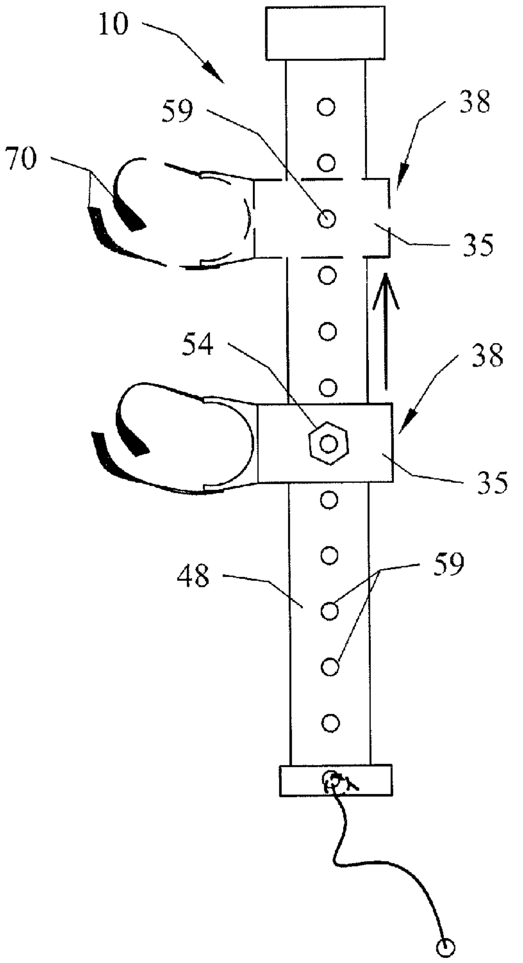
FIG. 9A is a front elevation view of a truss embodiment having a linear plug with moveable mounts.

Another embodiment, shown by way of non-limiting example in FIG. 9B, utilizes a bent plug 49 having one or more moveable mounts 38 thereon. A bent plug can provide support to antennas that may not fold down in close proximity to an advantageous boat structure. A bent plug can have a portion thereof or arm 50 that is curved or bent to one side at any desirable angle and/or shape. In the particular embodiment shown in FIG. 9B, the arm is straight and has an approximately 90° bend relative to the plug 40, which allows moveable mounts 38 thereon to be moved laterally. Alternative arm angles (e.g., < or >90°) and/or shapes (e.g., multiple curves) are anticipated. With a bent plug embodiment, the distal end 200 of the plug 40 can be placed within a rod holder, or attached to a boat structure as discussed above and the moveable mounts 38 can be moved laterally to any preferred location on the arm 50 to accommodate an antenna or other device that is not sufficiently aligned with the rod holder or other boat structure.

In a non-limiting specific example, a boat tower, when folded for travel may not align with structures that allow a plug 40, with an immovable mount, to be utilized. The bent arm embodiment with one or more moveable mounts allows versatility in the placement of the plug and or the mount to accommodate the position of one or more of the tower posts, so as to hold it the securely against one or more lower boat structures, such as, for example, the posts on the lower portion of the tower.

A plug 40 and arm 50 can be of any length. However, depending upon the materials utilized, the arm 50 of the bent plug can experience some flexing or bending commensurate with the length of the arm. As mentioned above, this flexibility can be an advantageous feature. But, if such flexing is not required, it may be preferable to utilize different materials that inhibit flexing or provide additional support for the arm, such as, for example, one or more gussets 51 between the arm and the plug, shown, for example, in FIG. 9B.

Figure 9D:
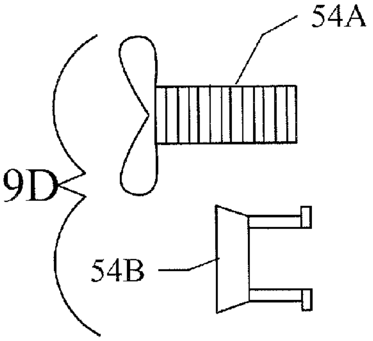
FIG. 9D shows non-limiting examples of pinning mechanisms that can be used to secure a moveable mount on a plug.
Figure 9C:
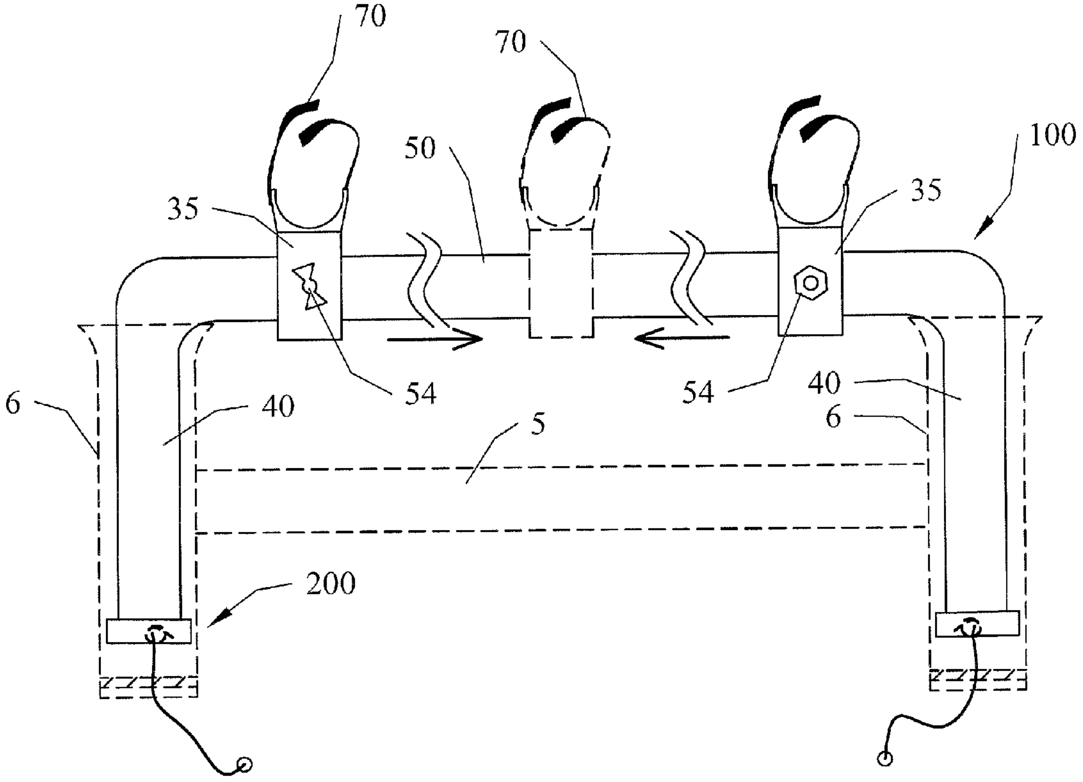
FIG. 9C is a front elevation view of a truss embodiment having a dual plug with an arm between them and moveable mounts.

In one embodiment, there can be two plugs at either end of the arm for support at both ends to minimize flexure. FIG. 9C illustrates a twin plug 52 embodiment wherein two plugs 40 are operably connected by an arm 50. In FIG. 9C, the twin plug is shown with both distal ends 100 inserted into rod holders connected to a post (dashed lines). It should be understood from previous discussion herein that the twin plug embodiment can also comprise any of a variety of attachment mechanisms 35 and can be attached to other boat structures.

Figure 10:
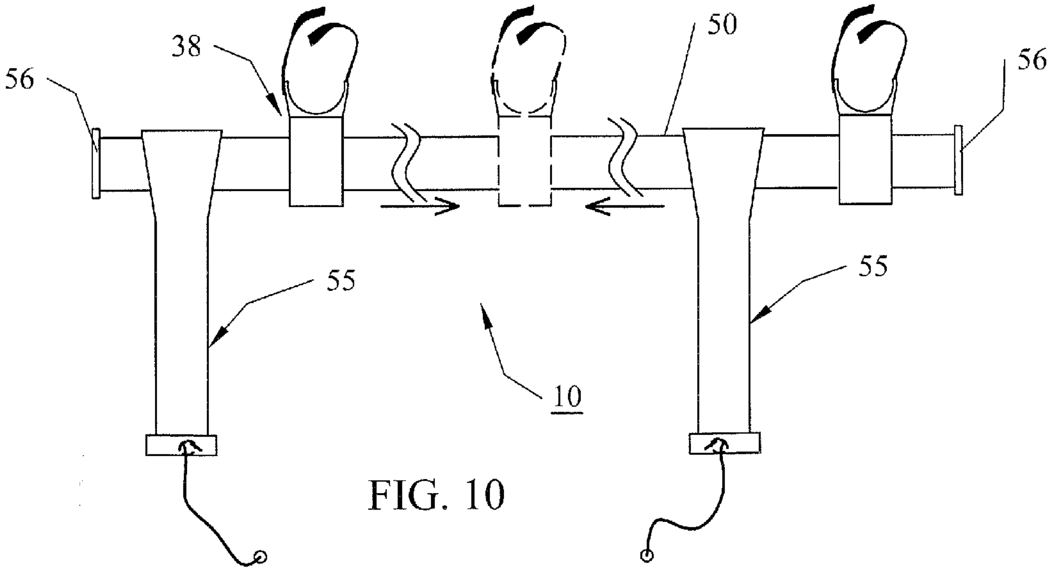
FIG. 10 is a front elevation view of a truss embodiment having dual moveable plugs on an arm with moveable mounts.

In a further embodiment, the arm 50 of a bent plug 49 and/or a twin plug 52 embodiment can have one or more moveable plugs 55 as well. A moveable plug can be one that is moveable or adjustable along at least part of the length of the arm or even another boat structure. In one embodiment, one or more plugs 40 can be configured at the proximal end with at least one slidable or moveable attachment mechanism 35 that slidably affixes the plug to the arm 50, along with the one or more, fixed and/or moveable mounts. In a further embodiment, the arm can have one or more stops 56, such as at either end of the arm, to prevent a moveable plug and moveable mount from being withdrawn from the end of the arm. In a still further embodiment, the stops can be removable as well, so that the moveable mounts and moveable plugs can be removed from one or both ends of the arm and rearranged on the arm. FIG. 10 illustrates an example of a twin plug 52 embodiment having moveable mounts 38, moveable plugs 55, and a stop 56 at either end of the arm 50. Also shown in this figure is an example arrangement of those components.

Figure 11A:
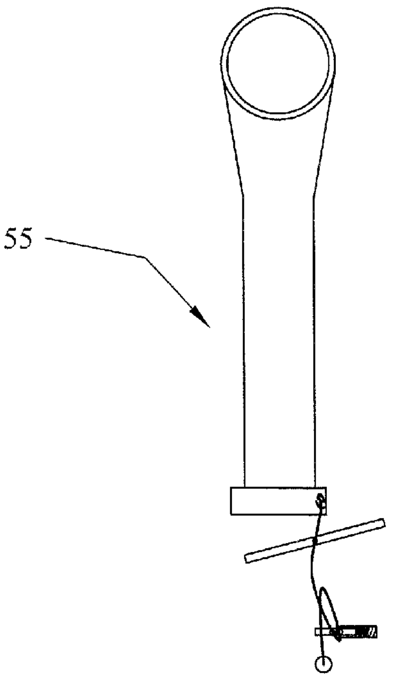
FIG. 11A is a front elevation view of a moveable plug embodiment that can be employed with the truss embodiment in FIG. 10.
Figure 11B:
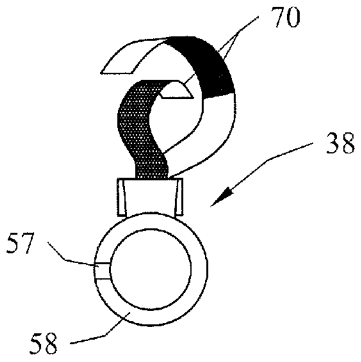
FIG. 11B is a front elevation view of a moveable mount embodiment that can be employed with the truss embodiment in FIG. 10.

A moveable mount 38 and a moveable plug 55 can be configured with any of a variety of attachment mechanisms 35 that facilitate their attachment to an arm. In one embodiment, the attachment mechanism allows a moveable mount or moveable plug to be affixed to the arm without having to be removed from one end of the arm. A non-limiting example of this could be a clip-like attachment mechanism that snaps or fits over the arm, like that shown in FIG. 6A. The advantage to this embodiment is that it permits quick, easy removal or attachment of one or multiple moveable mounts and/or moveable plugs. Another non-limiting example could be a bracket sleeve 58, such as shown, for example in FIGS. 11A and 11B, which show a moveable plug and a moveable mount, respectively. A bracket sleeve can encircle, entirely or partially, the arm 50 and slide along the arm for adjustability. Bracket sleeves and clips are well-known to those skilled the art of such devices. It is within the skill of a person trained in the art to also devise alternative devices and methods for allowing a plug to slide or move on an arm. Such variations which provide the same function, in substantially the same, with substantially the same result, are within the scope of this invention.

It should be understood that the embodiments described above pertaining to a ball and socket mechanism and/or a rocker arm mechanism could also be utilized with an arm, such that the arm can be rotated or rocked to an angle that accommodates a structure and/or antenna. A person with skill in the art would be able to devise an arm 50 and/or plug with a ball and socket or rocker arm configuration. Such variations are within the scope of this invention.

In a further embodiment, a moveable bracket once properly placed, can be secured in that desirable location on the plug. In one embodiment, the mount can have at least one through hole 57 that can be aligned with at least one of a plurality of adjustment holes 59 in the plug. A pinning mechanism 54 can be used to traverse a through hole and into an adjustment hole, so as to secure the moveable mount in one location. A pinning mechanism can be any device, known to those with skill in the art, which can be used with an adjustment hole 59 and/or a through hole 57 to secure a moveable mount. In one embodiment, a pinning mechanism is a winged bolt 54A that screws into one of the holes or into the aligned holes. Alternatively, a pinning mechanism can be utilized without there being one or more holes in the arm, such that the pinning mechanism exerts force on the arm, through the mount hole 57 to secure the mount in place on the arm. By way of non-limiting example, a winged bolt 54A can be screwed through the mount hole 57 until it exerts sufficient force against the arm to inhibit movement of the mount. One example of this embodiment is shown in FIG. 9C where the arm does not have holes, but one or more pinning mechanisms secure the position of a mount.

In another embodiment, a pinning mechanism is tabbed flange device with elongate flanges with a shoulder tab at one end. The flanges can be squeezed together to fit into one of the holes or into the aligned holes, and when released automatically move apart so that the shoulder tabs engage with the edges of the hole, temporarily preventing removal of the flanges or movement of the mount. FIG. 9D shows some non-limiting examples of these pinning embodiments. A person with skill in the art will also be able to determine any of a variety of alternative methods and devices for securing a moveable mount to a plug. Such variations are within the scope of the subject invention, to the extent that they do not detract from the operation of the embodiments described herein.

As mentioned above, the general purpose of a plug is to facilitate attachment of a mount to a boat structure. In one embodiment, the plug has one or more attachment mechanisms 35 thereon, such as described above, for attachment to a boat structure. FIGS. 6A and 6B illustrate non-limiting examples of plug embodiments with a clip-type and hook-and-loop material attachment mechanisms, respectively. Other types of attachment mechanisms, as determined by a person skilled in the art, can also be utilized and such variations are within the scope of the subject invention.

Figure 4A:
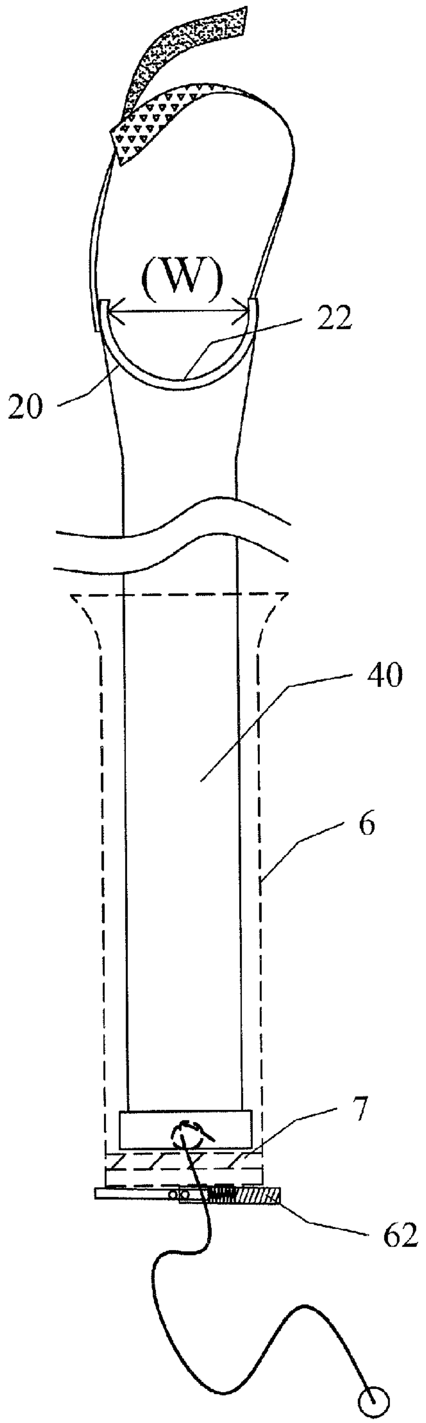
FIG. 4A is a front elevation view of another embodiment of a truss according to the subject invention, illustrating that the length of the plug can vary. The dashed lines represent a rod holder into which the plug of the truss has been disposed. The plug in this embodiment is longer than the length of the rod holder.
Figure 4B:
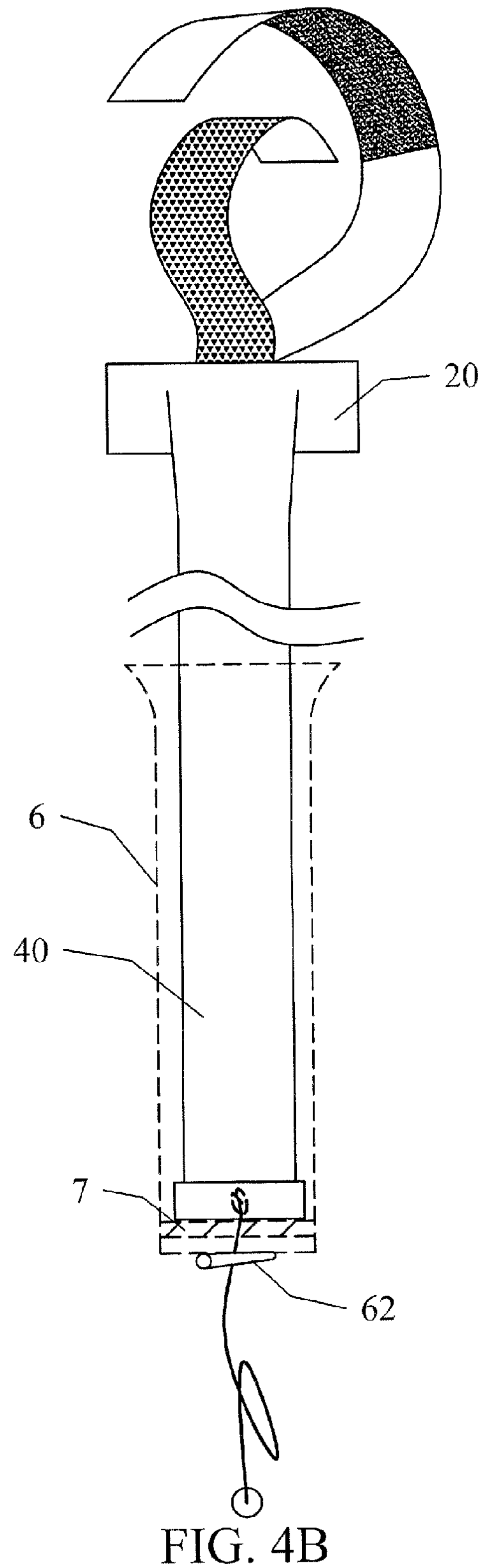
FIG. 4B is a front elevation view of another embodiment of a truss according to the subject invention, illustrating that the length of the plug can vary. The dashed lines represent a rod holder into which the plug of the truss has been disposed. The plug in this embodiment is longer than the length of the rod holder.

In a specific embodiment of the subject invention, the plug is adapted to be inserted into a rod holder 6 or a similar type of boat structure. FIGS. 2B, 2C, 4A and 4B illustrate some examples of a plug adapted to be insertable into a rod holder. In this embodiment, at least the distal end 200 of the plug has a shape and/or diameter that allows it to be inserted into a rod holder or similar structure. Any of a variety of plug locks 80 can be used to temporarily secure a plug into a rod holder. In one embodiment, the plug diameter is smaller than the diameter of the rod holder, allowing the plug to slide in and out of the rod holder relatively easily. FIGS. 4A and 4B illustrate non-limiting examples of this embodiment. In another embodiment, the diameter of the plug, or some portion thereof, is such that the plug cannot slide into and out of a rod holder easily. In a further embodiment, the plug is held in the rod holder by means of a friction fit. In yet a further embodiment, some portion of the plug can comprise or have thereon or there around, a material that is beneficial to achieving a friction fit within a rod holder. For example, a full or partial collar 42, examples of which are shown in FIGS. 2B and 2C, can be affixed to or around the plug to aid in obtaining a friction fit with a rod holder. The collar can comprise any of a variety of materials that are beneficial to enabling a friction fit with a rod holder, such as, but not limited to, rubber, silicone, nylon, plastic, wood or wood products, a textile material, or combinations thereof.

In an alternative embodiment, the plug can be configured with a “flip lock” that allows the plug to be inserted into a rod holder, and, when activated, prevents the plug from being removed from the rod holder. Flip lock devices are well-known in the art, typically being found on many types of boat drain plugs—often referred to as “flip lock” drain plugs. These types of plugs comprise a flexible rubber sleeve around a shaft of adjustable length. A rotatable or flipable handle at one end of the drain plug is adapted to be a linear actuator, such that it can be manipulated to move the shaft, usually in a proximal direction 100 causing the rubber sleeve to be constricted, so as to form folds, bulges, or be otherwise bunched up around the shaft, resulting in an increase in the sleeve diameter. If the drain plug is inserted into a drain hole and activated, the rubber sleeve, when constricted can grip the walls of the drain hole preventing leaks and also preventing the plug from being removed.

Figure 7A:
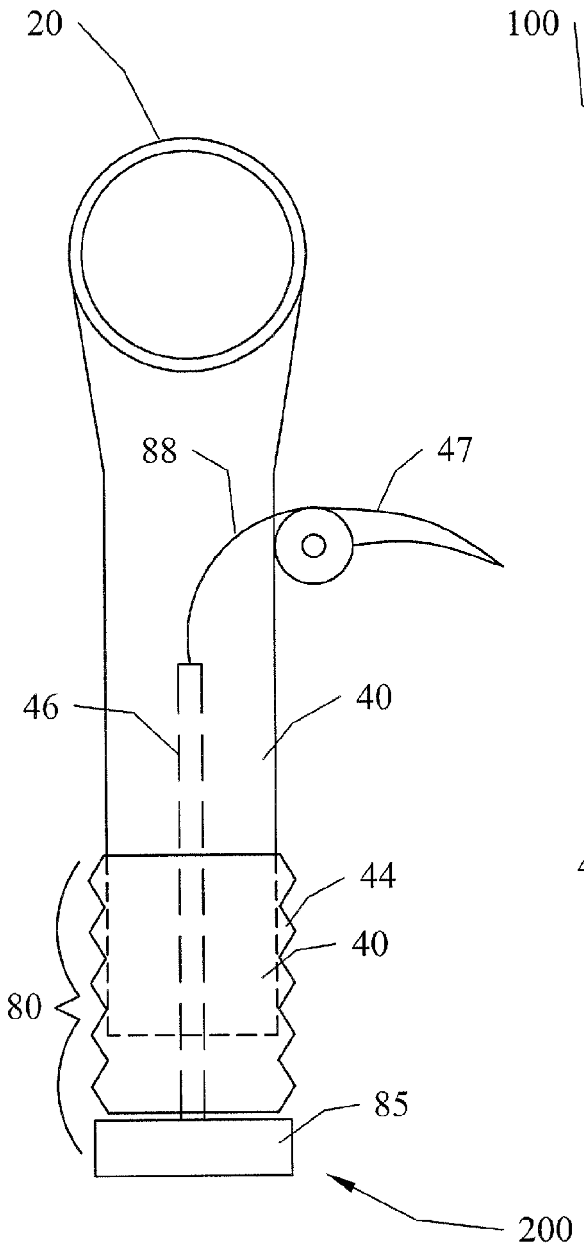
FIG. 7A is a front elevation view of an embodiment of a truss according to the subject invention utilizing a compressible sleeve around the plug. The compressible sleeve can be squeezed from one or both ends to create a larger diameter, which allows the compressible sleeve to grip against the sides of an opening in which it is inserted.
Figure 7B:
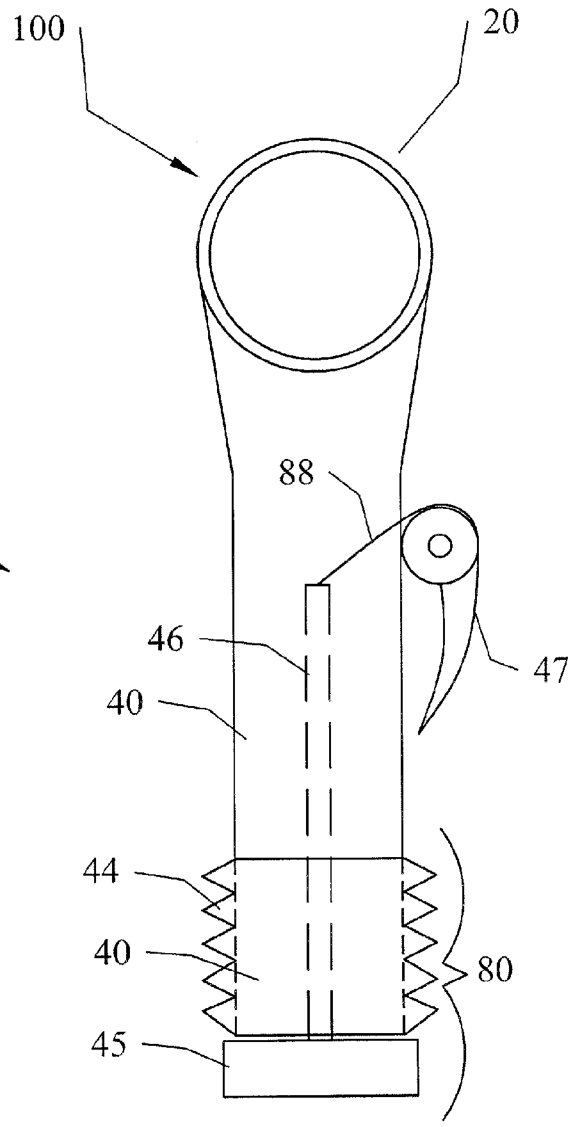
FIG. 7B is a front elevation view of the truss embodiment in FIG. 7A, wherein the compressible sleeve has been squeezed, constricted or otherwise shortened to increase diameter.

A similar arrangement can be utilized with a truss and plug of the subject invention. FIGS. 7A and 7B illustrate one embodiment of a plug lock 80 comprising a compressible sleeve that can be used to secure a plug. FIG. 7A shows a compressible sleeve 84 encircling part of the plug 40. In a further embodiment, the compressible sleeve is secured in such fashion that the proximal end 100 remains in substantially the same position on the plug. This can be accomplished by any of a variety of methods or techniques known to those with skill in the art, including, but not limited to fixedly attaching the proximal end of the sleeve to the plug or by some structure(s) on the plug that prevents the compressible sleeve from moving proximally. The distal end of the compressible sleeve can rest against a platform 85 attached to a shaft 86 at the distal end 200. The platform 85 can be positioned a sufficient distance from the distal end 200 of the plug so that the platform can be moved, as described below.

In a further embodiment, a rotatable handle 87 can be fixedly attached to the shaft 86, either directly or by means of a connecting mechanism 88, and positioned, so as to be operable from the outside of the plug, such as shown in the examples in FIGS. 7A and 7B. When the handle is rotated in the appropriate direction, downward, for example, as seen in FIGS. 7A and 7B, it can perform as a linear actuator, such that as it is rotated, it causes the shaft, and a connecting mechanism 88 if utilized, to pull the platform 85 proximally 100 and towards the distal end of the plug. This proximal motion of the platform causes the compressible sleeve to be shortened and constricted, so that at least part or sections of it bulge outward or away from the plug, increasing the compressible sleeve’s diameter. With this embodiment, if the plug is disposed within a rod holder, or the like, when the handle is rotated, it will cause the compressible sleeve 84 to make contact with the rod holder 6 and inhibit withdrawal of the plug 40. This embodiment is advantageous because it allows the truss to be used in a rod holder located anywhere on a boat, in particular, ones located in the gunnel of a boat. This can make a truss of the subject invention particularly advantageous as a support for a push pole, which is often stored parallel to a gunnel of a boat.

Figure 7C:
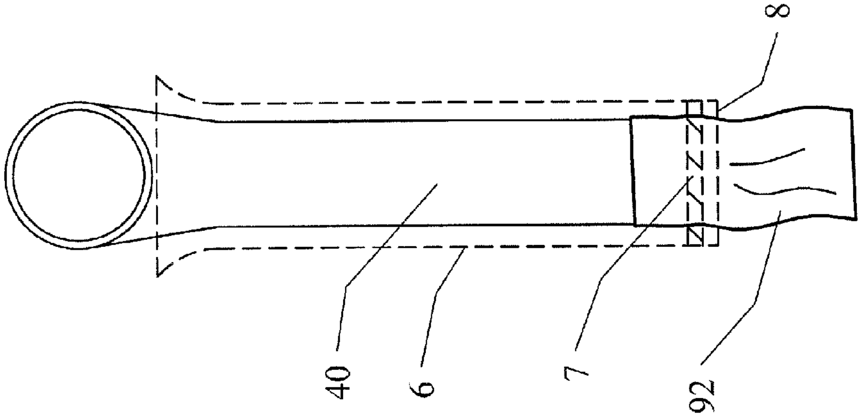
FIGS. 7C, 7D, 7E, 7F, 7G and 7H show alternative embodiments of plug locks, according to the subject invention
Figure 7D:
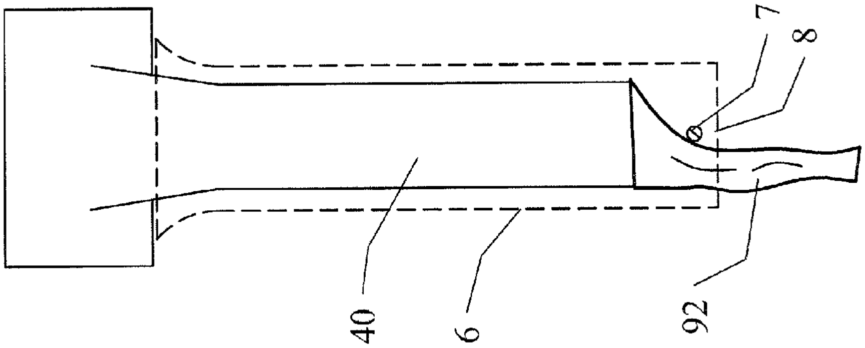
Figure 7E:
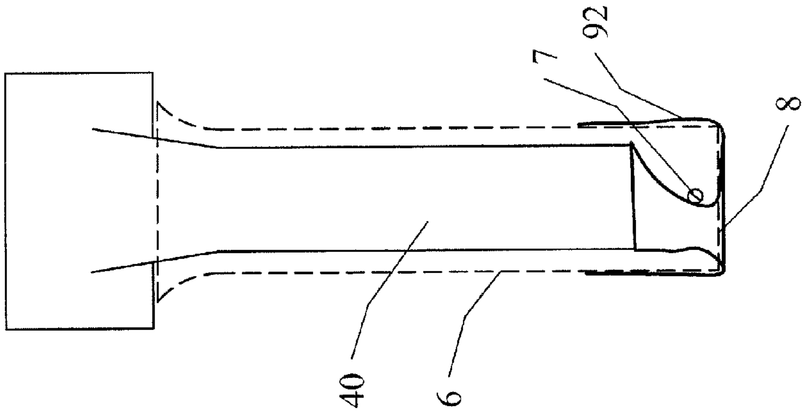

Another embodiment of a plug lock 80 is an end connector 90 that engages with or around the port 8 at the bottom end of a rod holder. In one embodiment, an end connector is a flexible tubular-shaped cuff 92 that extends from the distal end of the plug, shown, for example, in FIG. 7C. The cuff 92 can be inserted into the rod holder with the plug and protrude from the port 8. The flexibility of the cuff allows it to go around, to one side or the other, of a crossbar, if present, which is illustrated in FIG. 7D. The cuff can then be folded proximally, around the bottom end of the rod holder to surround the port 8, as shown in the example in FIG. 7E. In one embodiment, the cuff comprises a material that allows it to be folded and/or manipulated around the port 8, and either maintain the folded shape around the port or form a friction fit with the rod holder, as shown in FIG. 7E. By way of non-limiting example, the cuff can be manufactured of a rubber or rubberized material that provides flexibility for manipulation of the cuff around the rod holder, but sufficient tensile quality to stay in position around the port. By way of further non-limiting example, the cuff can comprise any type of elastic material that can be folded or otherwise manipulated around the rod holder to provide a friction fit or compression fit around the rod holder. FIG. 7D illustrates an example of a cuff that has been extended out of the port 8 and FIG. 7E shows it folded back up onto the rod holder to keep the truss in the rod holder.

Figure 7H:
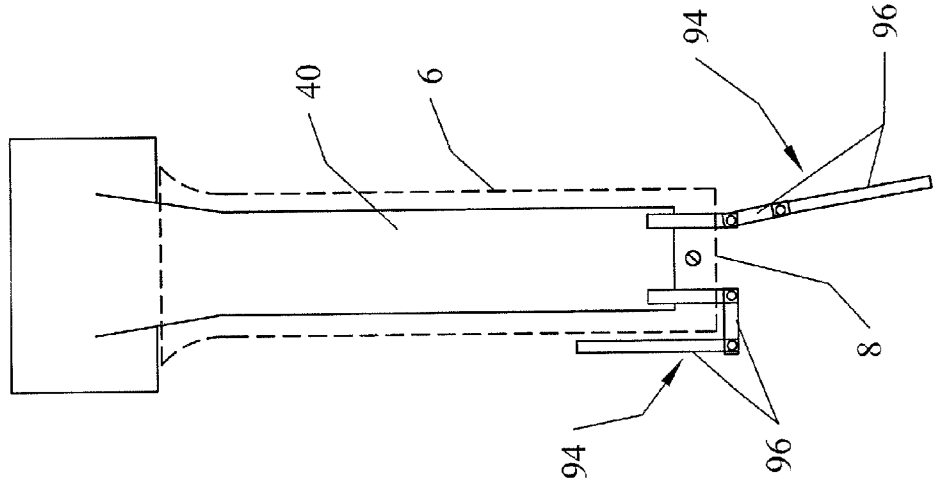
Figure 7G:
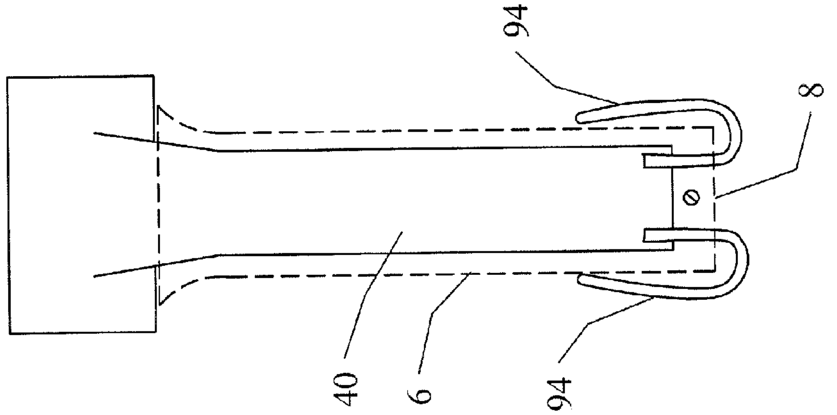
Figure 7F:
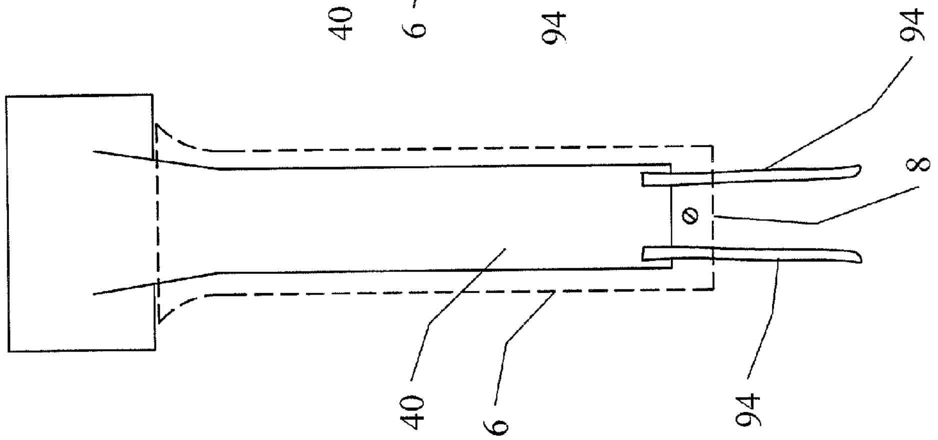

Another non-limiting example of an end connector 90 is a bendable extender 94. A bendable extender can protrude past the port 8 and can have a portion thereof that can be bent, turned, twisted, or otherwise directed towards the proximal end of the truss, such that the bendable extender forms a hook around the port 8. FIG. 7F shows one example of a bendable extender embodiment. A single bendable extender can be used or two or more bendable extenders can be used, as shown in FIGS. 7F and 7G. In one embodiment a bendable extender comprises one or more materials that can be formed or shaped into a hook to secure the truss to a rod holder, and example of which is shown in FIG. 7G, and can be easily reformed to a linear configuration to insert or remove the truss from a rod holder. Non-limiting examples of bendable extenders are aluminum or other types of soft or moldable metal rods or plates, flexible layered plastics that "snap" to a particular configuration, moldable nylon, and other materials known to those with skill in the art.

Alternatively, a bendable extender can comprise jointed sections 96 that can be made generally straight enough to extend past a port and then the sections can be bent, turned, twisted or otherwise formed into a hook or other shape that will secure the truss in the rod holder. FIG. 7H illustrates an example of this embodiment.

A person with skill in the art will be able to determine alternative plug lock 80 embodiments that can be utilized with the embodiments of the subject invention. For example, there are any of a variety of devices that can be utilized to move the platform or otherwise, shorten and bunch up the compressible sleeve. The compressible sleeve can also comprise any of a variety of configurations or structures that aid in the process of contacting and/or gripping the inside of a rod holder. Likewise, any of a variety of devices can be used to secure the distal end of the plug around the port 8. Such alternatives, which provide the same function, in substantially the same way, with substantially the same result, are within the scope of the subject invention.

Rod holders usually have an open bottom end or some type of open port 8 at the bottom end that allows water or other material to wash out to prevent accumulation. There can also be a crossbar 7 that traverses the port 8, to prevent a rod handle from being inserted too far into the rod holder and getting stuck or damaging the rod. FIGS. 2B and 2C illustrate, with the dashed lines, a rod holder 6 having a port 8, and the optional crossbar 7.

As discussed above, truss embodiments of the subject invention can be operably inserted into a rod holder for support. In one specific embodiment, a truss 10 can further have a securing lanyard 60 for holding a truss 10 within a rod holder. This type of plug lock can have a multitude of configurations, but typically includes an elongated, flexible material, herein referred to as a cord 62 having one end fixedly attached at or about the proximal end of a plug 40, by any of a variety of methods known to those with skill in the art, and a cord lock 64 that can traverse the length of the cord. Cord locks are commonly known in the art and are often spring-loaded devices that can be squeezed or pressed to allow the cord lock to move along the length of a cord and when released causes the cord lock to remain in one location on the cord. However, other types or styles of cord lock-type devices can also be utilized and such variations are within the scope of this invention.

Figure 12E:
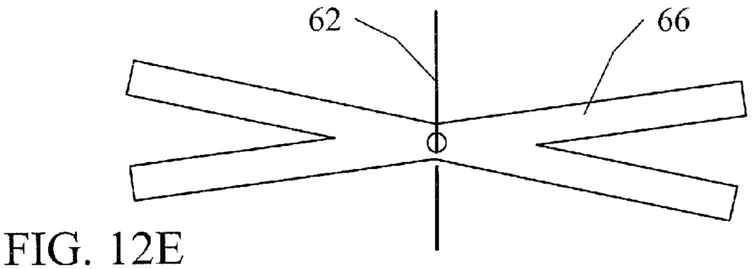
FIG. 12E illustrates an alternative embodiment of a stop piece.
Figure 12D:
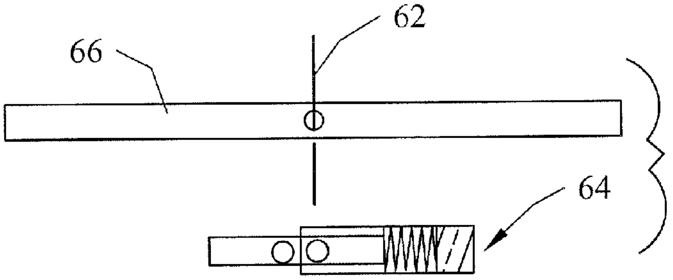
FIG. 12D illustrates an embodiment of a cord lock and an embodiment of a stop piece that can be utilized together.
Figure 12C:
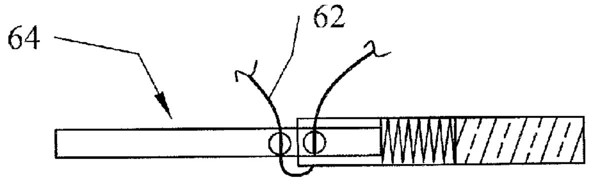
FIG. 12C illustrates one embodiment of a cord lock that can be utilized with embodiments of the subject invention.
Figure 12A:
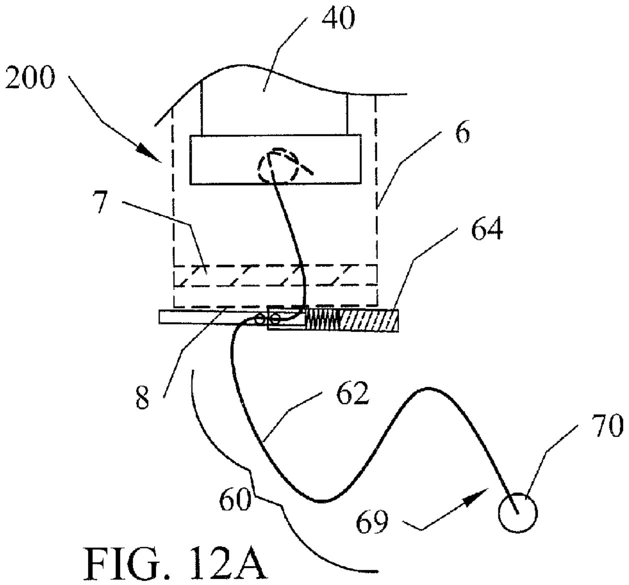
FIG. 12A is a partial front elevation view of a truss embodiment of the subject invention with a securing lanyard.

In use, a cord and cord lock can be dropped into a rod holder prior to inserting the plug. The cord lock can emerge from the port 8 pulling the cord along with it. Ideally, the cord lock will be able to pass to one side or the other of a crossbar, if present. The plug can be seated into the rod holder and the cord lock, extending through the port, can be moved along the length of the cord until it contacts the port or distal end of the rod holder, abutting against it to hold the plug in the rod holder. FIG. 12A illustrates an example of a securing lanyard with the cord lock nestled against the distal end of a rod holder and a truss being held within the rod holder by means of the cord being pulled taught against the proximal end of the plug. In a further embodiment, the cord lock can have a shape and dimensions that are larger than the port, so as to allow the cord lock to press against or otherwise contact the proximal end 200 of the rod holder, without going entirely through the port, so as to resist the truss being withdrawn from the rod holder. An example of this is shown in FIG. 12A. To remove the truss, the cord lock can be moved along the cord and away from the port and then turned or rotated to fit through the port and slid through the rod holder as the truss is removed. Thus, the dimensions of the cord lock should be such that it can pass through the port in either direction, with or without a crossbar being present. In one embodiment, the cord lock is substantially linear, rod-like, or narrow making it easy to pass through the port, such as shown, for example, in FIG. 12C. However, it should be understood that a cord lock can have any shape or dimensions that allow it to operate as intended.

Figure 12B:
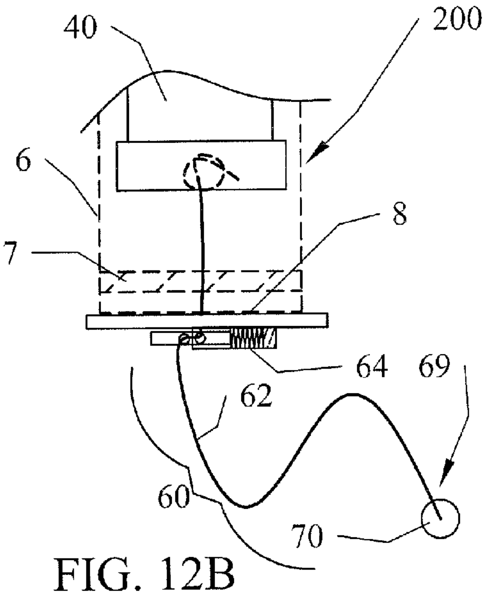
FIG. 12B is a partial front elevation view of a truss embodiment of the subject invention with a securing lanyard and a stop piece.

In a further embodiment, a stop piece 66 can be used in conjunction with a cord holder. A stop piece 66 can be a device or object that goes over, or around the cord and can be used with a cord lock to secure a truss within a rod holder. FIGS. 12D and 12E illustrate some non-limiting examples of stop pieces that can be used with the embodiments of the subject invention. A stop can be used to press against the port or distal end of the rod holder and the cord lock can be used, as described above, to hold the stop 66 in place. This can allow a smaller cord lock to be used to hold the stop in place on the cord and the stop can actually apply the necessary resistance to prevent the truss from being removed from the rod holder. FIG. 12B illustrates an example of a cord lock 64 being used in conjunction with a stop piece 66 to secure the stop against the rod holder. Thus, the dimensions of the stop piece and cord lock should be such that they can pass through the port in either direction, with or without a cross bar being present. In one embodiment, the stop piece and cord lock are substantially linear, rod-like, or narrow making it easy to pass through the port. However, it should be understood that a cord lock can have any shape or dimensions that allow it to operate as intended. FIGS. 12D and 12E illustrate non-limiting examples of stop pieces 66 that can be used with a cord lock 64. One advantage of utilizing a stop piece is that a smaller cord lock can be utilized.

Lastly, to facilitate the cord 62, cord lock 64, and stop piece (if utilized), passing through the port, it can be helpful if a weight is used to pull the non-attached end of the cord through the port. In a further embodiment, the free-end 69 of the cord can have a fob 70 attached, wherein the fob has a shape and weight that assist in passing the free-end of the cord through the port. Needless to say, the fob can have any desirable shape or configuration that permits it to pass through the port and past the crossbar, if present.

The factors that can be considered by those skilled in the art with regard to the choice of materials for each of the components of the subject invention have been discussed above with regard to the mount and the plug and are reasserted here with regard to the cord, cord lock, stop piece, and fob. In a particular embodiment, these components of certain embodiments of the invention are comprised of, but are not limited to, polyvinyl chloride (PVC), plastic, nylon, ceramic, fiberglass, or combinations thereof. In a specific embodiment, the components are comprised of weather resistant materials and, more specifically UVA and/or UVB resistant materials.

It should be understood that any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is submitted that it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

We claim:

1. A device adapted to secure an object to a tubular structure, the device comprising:

- a truss having a distal end and a proximal end, the truss further comprising,
  - at least one mount at the proximal end of the truss, where the mount has a mount surface against which the object is secured;
  - a moveable stay mechanism operable with the at least one mount that goes over the mount surface for holding the object against the mount surface and moves away from the mount surface for removing the object from the mount surface;
  - a plug attached to the at least one mount, where the plug is at the distal end of the truss and is perpendicular to the mount surface and adapted to be inserted into the tubular structure; and
- a plug lock incorporated with the plug, such that, when the plug is inserted within the tubular structure, the plug lock engages with the tubular structure, wherein the plug lock acts to secure the truss to the tubular structure.

2. A device according to claim 1, wherein the mount surface is curved for complementarily receiving the object.

3. A device according to claim 2, wherein the mount surface is semi-circular.

4. A device according to claim 1, wherein the mount is rotatably attached to the plug.

5. A device according to claim 4, wherein the mount and plug are attached by a ball and socket configuration.

6. A device according to claim 4, wherein the mount and plug are attached by one or more rocker arms.

7. A device according to claim 1, wherein the stay mechanism is flexible or at least partially conforming to the shape of the object secured against the mount surface.

8. A device according to claim 1, wherein the stay mechanism is rigid or semi-rigid and is rotatably attached to the mount surface.

9. A device according to claim 1, wherein the plug further comprises a spring.

10. A device according to claim 1, wherein the plug further comprises multiple locking sections.

11. A device according to claim 1, wherein the plug lock is a cuff.

12. A device according to claim 1, wherein the plug lock comprises a compressible sleeve operable with a platform at the distal end of the truss.

13. A device according to claim 1, wherein the plug lock comprises a securing lanyard operable with a cord lock that adjusts along the length of the securing lanyard.

14. A device according to claim 13, further comprising a stop piece moveably attached to the lanyard, between the plug and the cord lock.

15. A device according to claim 1, wherein the plug comprises at least one arm directed at an angle between 0° and 90°.

16. A device according to claim 15, wherein the at least one mount is disposed on the arm.

17. A device according to claim 16, wherein the at least one mount is movably disposed on the arm.

18. A device according to claim 17, wherein the at least one moveably disposed mount is securable to the arm.

19. A device according to claim 18, wherein the at least one moveably disposed mount is secured to the arm with a bracket sleeve.

20. A device according to claim 18, further comprising at least a second plug attached to the arm.

21. A device according to claim 20, wherein the second plug is moveably attached to the arm.

22. A device according to claim 21, further comprising a pinning mechanism for securing at least one of the second plug and moveably disposed mount.

23. A device according to claim 1, wherein the tubular structure is a rod holder.

* * * * *